US012657264B1

(12) United States Patent
Lee

(10) Patent No.: US 12,657,264 B1
(45) Date of Patent: Jun. 16, 2026

(54) SYSTEMS AND METHODS FOR ACTIVATION-KEYED DUAL-CHANNEL WATERMARKING WITH CONTENT-ONLY VERIFICATION AND VERIFIABLE INFERENCE CREDENTIALS (VIC-WM)

(71) Applicant: Yong Bok Lee, Sheridan, WY (US)

(72) Inventor: Yong Bok Lee, Sheridan, WY (US)

(73) Assignee: Gate of Remembrance LLC, Sheridan, WY (US)

( * ) Notice: Subject to any disclaimer, the term of this patent is extended or adjusted under 35 U.S.C. 154(b) by 0 days.

(21) Appl. No.: 19/458,769

(22) Filed: Jan. 24, 2026

Related U.S. Application Data

(60) Provisional application No. 63/916,532, filed on Nov. 13, 2025.

(51) Int. Cl.
| | |
|---|---|
| *G06F 21/00* | (2013.01) |
| *G06F 21/16* | (2013.01) |
| *H04L 9/08* | (2006.01) |

(52) U.S. Cl.
CPC ............ *G06F 21/16* (2013.01); *H04L 9/0861* (2013.01)

(58) Field of Classification Search
CPC .............................. G06F 21/16; H04L 9/0861
See application file for complete search history.

(56) References Cited

U.S. PATENT DOCUMENTS

| | | | |
|---|---|---|---|
| 6,614,914 B1 | 9/2003 | Rhoads et al. | |
| 7,509,683 B2 | 3/2009 | Decime | |

| | | | |
|---|---|---|---|
| 8,781,967 B2 * | 7/2014 | Tehranchi | .......... H04N 1/32149 |
| | | | 705/50 |
| 10,121,025 B1 | 11/2018 | Rice et al. | |
| 10,176,309 B2 * | 1/2019 | Tormasov | ............... G06F 21/16 |
| 10,581,613 B2 | 3/2020 | Ford et al. | |
| 10,592,639 B2 | 3/2020 | Gaidar et al. | |
| 11,163,860 B2 * | 11/2021 | Gu | ........................... G06N 3/08 |

(Continued)

OTHER PUBLICATIONS

Kirchenbauer et al.; A Watermark for LLMs; arXiv:2301.10226; Jan. 24, 2023; pp. 1-26.

(Continued)

*Primary Examiner* — Kendall Dolly

(57) ABSTRACT

Systems and methods label machine-generated content. During inference, internal activations are sampled, projected, and error-correcting encoded to generate an activation digest. A cryptographic commitment to the activation digest is generated, and a session key is derived using a key-derivation function over inputs comprising at least the activation digest, inference context data, and a domain-separation label and, when available, validated attestation data. A watermark encoder embeds a dual-channel watermark into output content, including (i) a payload channel for statistical detection and (ii) a control-channel codeword for candidate record and/or commitment determination. A verifiable inference credential record includes the commitment, output metadata, policy flags, transparency metadata, and one or more digital signatures, and the commitment is recorded in a tamper-evident log with checkpoints and inclusion proofs. From content alone, a detector computes a payload statistic, decodes the codeword, verifies signatures and log inclusion, and outputs a provenance report with machine-verifiable reason codes.

24 Claims, 14 Drawing Sheets

(56)  References Cited

U.S. PATENT DOCUMENTS

| | | | | |
|---|---|---|---|---|
| 12,105,842 | B1 | 10/2024 | Dods et al. | |
| 12,238,392 | B2 * | 2/2025 | Simmons | G06F 21/44 |
| 2002/0016916 | A1 * | 2/2002 | Natarajan | H04N 1/32251 |
| | | | | 713/179 |
| 2004/0022444 | A1 * | 2/2004 | Rhoads | G06V 20/80 |
| | | | | 382/232 |
| 2004/0264735 | A1 | 12/2004 | Rhoads | |
| 2007/0016790 | A1 | 1/2007 | Brundage et al. | |
| 2007/0110237 | A1 * | 5/2007 | Tehranchi | H04N 21/2347 |
| | | | | 348/E7.056 |
| 2008/0077530 | A1 * | 3/2008 | Banas | G06Q 10/06 |
| | | | | 705/50 |
| 2018/0287802 | A1 * | 10/2018 | Brickell | H04L 9/006 |
| 2019/0220577 | A1 * | 7/2019 | Anikster | H04L 63/123 |
| 2019/0370440 | A1 * | 12/2019 | Gu | G06N 3/08 |
| 2020/0259663 | A1 | 8/2020 | Firsov | |
| 2021/0149733 | A1 * | 5/2021 | Cheng | G06N 20/00 |
| 2021/0319098 | A1 * | 10/2021 | Pogorelik | G06F 21/554 |
| 2021/0326463 | A1 * | 10/2021 | Nilsson | G06F 21/62 |
| 2024/0048361 | A1 | 2/2024 | Berger et al. | |
| 2024/0320529 | A1 * | 9/2024 | Dathathri | G06F 21/16 |
| 2024/0362738 | A1 * | 10/2024 | Alattar | G06V 40/171 |
| 2025/0103649 | A1 | 3/2025 | Sinha et al. | |
| 2025/0291909 | A1 * | 9/2025 | Fortkort | G06F 21/554 |

OTHER PUBLICATIONS

Wen et al.; Tree-Ring Watermarks; arXiv:2305.20030; May 31, 2023; pp. 1-16.
Fernandez et al.; The Stable Signature; ICCV 2023; Oct. 2023; pp. 22466-22477.
C2PA; Content Credentials Spec v2.1; Sep. 20, 2024; pp. 1-226.
C2PA; Attestation in the C2PA Framework (v1.4); C2PA Attestations Specification v1.4; Jan. 28, 2024.
C2PA; Soft Binding API v2.2; May 2025.
NIST; Reducing Risks Posed by Synthetic Content; NIST AI 100-4; Nov. 2024; pp. 1-81.
Laurie, B.; Langley, A.; Kasper, E.; Certificate Transparency; RFC 6962; Jun. 2013; pp. 1-27.
Birkholz et al.; RATS Architecture; RFC 9334; Jan. 13, 2023; pp. 1-46.
Costan, V.; Devadas, S.; Intel SGX Explained; IACR Cryptology ePrint Archive, Report 2016/086; 2016; pp. 1-118.

* cited by examiner

Figure 2:
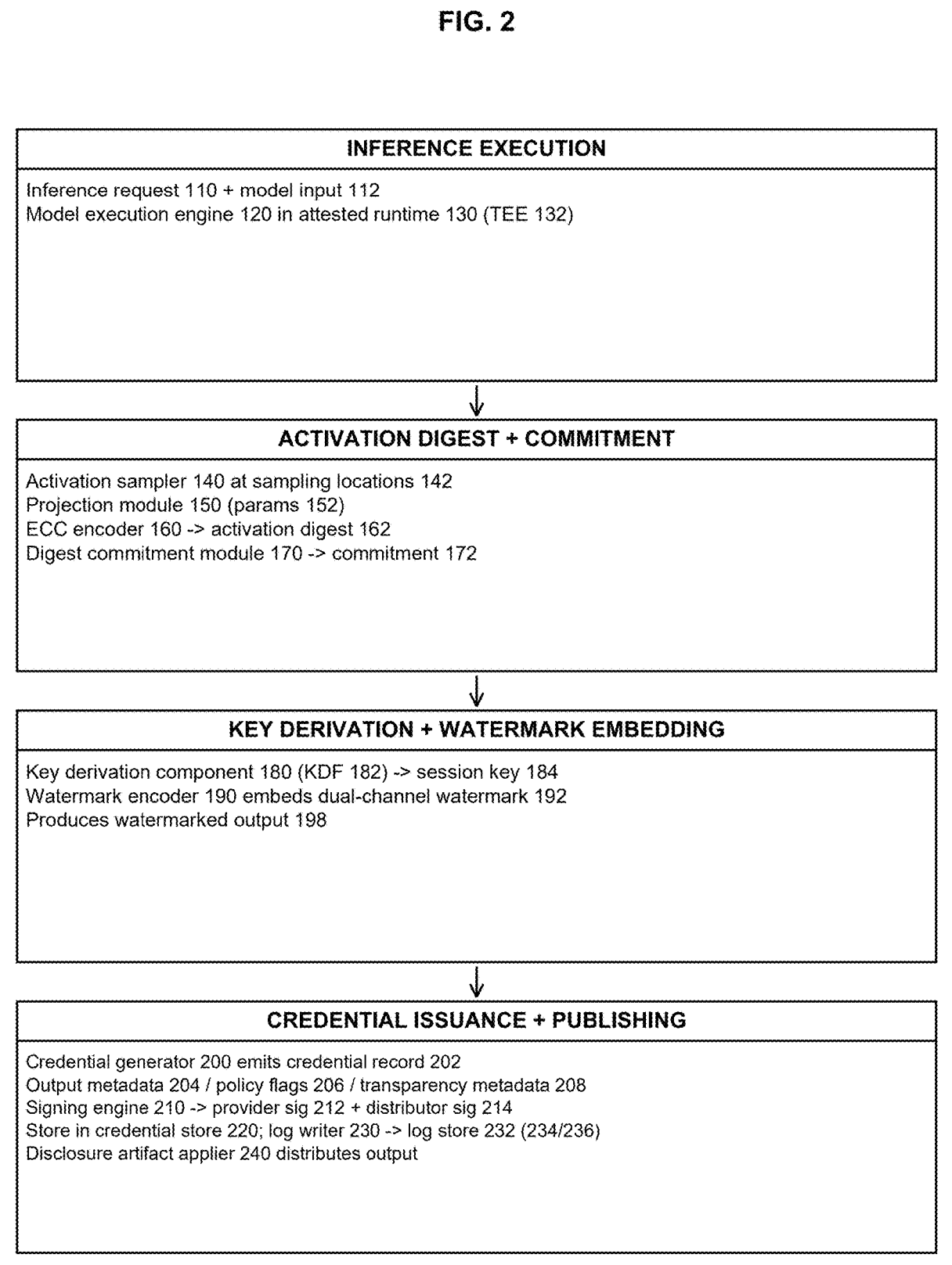

INFERENCE EXECUTION

Inference request 110 + model input 112
Model execution engine 120 in attested runtime 130 (TEE 132)

---

↓

ACTIVATION DIGEST + COMMITMENT

Activation sampler 140 at sampling locations 142
Projection module 150 (params 152)
ECC encoder 160 -> activation digest 162
Digest commitment module 170 -> commitment 172

---

↓

KEY DERIVATION + WATERMARK EMBEDDING

Key derivation component 180 (KDF 182) -> session key 184
Watermark encoder 190 embeds dual-channel watermark 192
Produces watermarked output 198

---

↓

CREDENTIAL ISSUANCE + PUBLISHING

Credential generator 200 emits credential record 202
Output metadata 204 / policy flags 206 / transparency metadata 208
Signing engine 210 -> provider sig 212 + distributor sig 214
Store in credential store 220; log writer 230 -> log store 232 (234/236)
Disclosure artifact applier 240 distributes output

WATERMARKED OUTPUT 198

Content

CREDENTIAL RECORD 202

Signatures 212/214

DISCLOSURE ARTIFACT APPLIER 240

Attaches disclosure artifacts:
- UI notice surface
- file/container metadata
- accessibility labels
Emits distributor signature 214

DISTRIBUTED ARTIFACT

Content + disclosure
Signature 214

NOTICE SURFACES

UI notice
Metadata
Accessibility label

REVOCATION / ROTATION SERVICE 270

Publishes signed key-status records

LOG STORE 232

Stores key-status records
Checkpoints 234 / proofs 236

CREDENTIAL RECORD 202

Signatures 212/214

CREDENTIAL VERIFIER 260

Checks key-status records
Applies rotation / revocation

RESULT

PASS / FAIL
Reason codes 266

Key-status record states: ACTIVE / ROTATED / REVOKED (illustrative)

SYSTEMS AND METHODS FOR ACTIVATION-KEYED DUAL-CHANNEL WATERMARKING WITH CONTENT-ONLY VERIFICATION AND VERIFIABLE INFERENCE CREDENTIALS (VIC-WM)

CROSS-REFERENCE TO RELATED APPLICATIONS

Cross-reference and incorporation by reference (illustrative; non-limiting). This application claims the benefit under 35 U.S.C. § 119(e) of U.S. Provisional Patent Application No. 63/916,532, filed Nov. 13, 2025, entitled "Activation-Bound Watermarking with Verifiable Inference Credentials for Machine-Generated Content," the entire contents of which are incorporated by reference herein to the extent not inconsistent with the present disclosure.

In the event of any inconsistency between an incorporated document and the present disclosure, the present disclosure controls. Incorporation by reference is for written description support only and does not limit the scope of the claims.

Cross-rail interoperation notice (illustrative; non-limiting; no admission). In certain embodiments, the VIC-WM verification rail may interoperate with one or more external governance rails that enforce permit-before-action semantics and emit structured, machine-verifiable safety receipts for AI-governed episodes (for example, an HTI-Ready Safety Receipt Layer). Such interoperation may include, without limitation, recording in a verifiable inference credential record and/or evidence bundle an evidentiary cross-rail reference to a safety receipt identifier, a permit outcome, and/or a policy digest or policy signature associated with an applicable policy graph or policy profile. Cross-rail references are evidentiary only and do not alter watermark embedding, detection thresholds, credential semantics, or transparency logging described herein; the claims control. Identification of any system, rail, or document is not an admission that it constitutes prior art.

Evidence-only interoperation; no essential material (illustrative; non-limiting). To the extent any external rail, receipt, policy graph, verifier, or conformance profile is referenced, it is referenced for evidentiary interoperability only and does not supply essential material necessary to support the claims; all essential material supporting the claims is provided expressly in the present disclosure. In the event of any inconsistency, the present disclosure controls.

Cross-rail conformance interoperation notice (illustrative; non-limiting; no admission). In certain embodiments, the VIC-WM verification rail may additionally interoperate with a replay-verifiable conformance receipt and deterministic validation layer for machine-assisted decision artifacts (for example, a Receipts and Validator Auditability/Conformance Layer (RVAL)). Such interoperation may include, without limitation, recording in a credential record and/or evidence bundle one or more evidentiary references to (i) a conformance receipt identifier or receipt digest, (ii) a conformance pack identifier or pack digest, (iii) a policy identifier and policy version digest, (iv) a validator identifier and validator digest, and (v) deterministic reason codes and/or a reason-code registry identifier and registry digest, enabling independent parties to verify that publication, distribution, or other side effects were performed only under an applicable conformance boundary. These references are evidentiary only and do not alter VIC-WM watermark embedding or detection semantics; the claims control.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

FIELD

The present disclosure relates to systems and methods for labeling and verifying provenance of machine-generated content across modalities by implementing an end-to-end verification rail that embeds content-resident dual-channel watermark signals and binds those signals to a specific inference event using verifiable inference credential records comprising cryptographic commitments to activation-derived digests. In certain embodiments, watermark parameters are derived from internal execution signals and, when available, validated attestation data describing runtime integrity. The disclosure further supports content-only, offline-capable detection and verification under detector profiles and predetermined detection thresholds, including verification of credential signatures and tamper-evident log inclusion via transparency checkpoints and inclusion proofs, and, when present, verification of key-status records and disclosure-preservation signatures for distribution-channel accountability.

BACKGROUND

Widespread use of generative models increases the volume and impact of machine-generated content across text, image, audio, and video modalities. Content consumers, platforms, and regulators increasingly seek reliable signals indicating whether content is machine-generated and whether required disclosures were provided.

In various contractual, regulatory, or policy frameworks, providers and deployers of AI systems may be required to label or mark content as machine-generated; provide traceable provenance for such content; and maintain logs sufficient for investigation, auditing, or post-deployment monitoring.

In some frameworks, transparency obligations may further include presenting a human-perceivable disclosure that content was generated or materially modified by an AI system; providing a machine-readable marking that remains detectable after common transformations; and maintaining evidence that the disclosure and marking were applied, for example via logs, manifests, or signed credentials. Certain frameworks further emphasize that disclosures be clear, distinguishable, and accessible to end users, and that deepfake-like content be labeled in a manner that users can readily perceive.

Some watermarking techniques for AI content typically operate solely on the observable output domain. Such techniques can be fragile under transformations such as paraphrasing, re-encoding, cropping, scaling, or editing, and they may not bind the watermark to a specific model instance or runtime environment that produced the output.

Some content provenance frameworks may attach signed manifests or metadata containers to files or data streams. However, such metadata is frequently stripped during distribution, for example via reposting, screenshotting, or transcoding, and may require online access to a provider service for verification.

Providers may maintain internal logs of inference activity, but log formats and assurance levels vary widely and are not typically linkable to watermarks embedded in content. Consequently, downstream consumers, investigators, and regulators may lack a robust, offline-verifiable connection between a watermark in content and a specific inference event that produced the content.

There is therefore a need for mechanisms that (i) tie a watermark robustly to internal execution signals of a model (including internal activations) and, in some embodiments, to an attested runtime environment; (ii) yield detection signals that survive common content transformations; and (iii) issue compact, verifiable inference credentials that can be validated offline and linked to tamper-evident logs, without exposing proprietary model parameters or underlying internal execution signals.

Some watermarking approaches may be vulnerable to removal or laundering, for example via paraphrasing or re-encoding; may not bind provenance to runtime integrity; and may lack a verifiable credential record suitable for auditing and enforcement across distribution channels. Separately, signature-only or log-only provenance schemes may establish authenticity of a record, but may fail to link the record to an artifact embedded in the content itself; may not support content-only, offline verification; and may not address distributor non-compliance with disclosure requirements.

Modern laundering pipelines may involve multi-hop transformations including re-generation, remixing, recapture, or cross-model paraphrase chains, which can strip metadata and weaken output-only marks; accordingly, robust provenance signals benefit from being content-resident while remaining linkable to a cryptographically verifiable inference credential and tamper-evident publication.

Ethical and societal context (informative; non-limiting). The disclosed mechanisms are motivated in part by protecting users and communities from harms associated with deceptive or untraceable synthetic content, including fraud, impersonation, misinformation, and erosion of trust. These mechanisms aim to support transparent, accessible disclosures and audit-ready accountability while preserving privacy and minimizing unnecessary data exposure. This context is provided for understanding only and does not limit or interpret the claims. In certain embodiments, the motivation includes protecting our neighbors and communities through trustworthy disclosure and accountability.

SUMMARY

Disclosed embodiments provide an end-to-end provenance and labeling rail in which (i) a dual-channel watermark embedded in content provides content-resident detection signals, (ii) the watermark is parameterized by a session key derived from an activation-derived digest and, in some embodiments, validated attestation data, and (iii) a verifiable inference credential record binds the inference event to the content via a cryptographic commitment, thereby enabling offline, content-only verification that is linkable to tamper-evident transparency logging and, when present, distributor disclosure-preservation accountability.

In certain embodiments, a control-channel codeword enables a detector to determine a candidate credential record and a candidate commitment in a canonical commitment representation, wherein the candidate commitment is determined by at least one of: (i) extracting a commitment field from the candidate credential record; or (ii) deterministically reconstructing the candidate commitment from the control-channel codeword. The detector may verify provider signatures, log inclusion proofs anchored by transparency checkpoints (including witness cosignatures when present), key-status records when present, and disclosure preservation signatures when present, thereby producing a provenance report with machine-verifiable reason codes and evidence references under a detector profile and a predetermined detection threshold.

Offline verification from content alone is supported as a baseline; any online retrieval of additional evidence is an optional enhancement and does not limit the disclosed mechanisms.

In certain embodiments, the disclosed verification rail improves safety and accountability for high-impact distribution contexts by enabling clear, accessible disclosure and evidence-based auditing without requiring exposure of proprietary model parameters or underlying internal execution signals.

Unity and search guidance (non-limiting). For search convenience only, the disclosed embodiments may be understood as an integrated verification rail in which content-resident dual-channel watermark signals are bound to verifiable evidence of a specific inference event via activation-derived digests, cryptographic commitments, and verifiable inference credential records, enabling content-only verification linkable to tamper-evident transparency logging and, when present, disclosure-preservation accountability. Nothing herein concedes unity or waives any right to traverse any restriction requirement.

In certain embodiments, content-only, offline-capable verification is enabled by distributing, packaging, or locally caching an evidence bundle that includes and/or references a transparency checkpoint and a corresponding inclusion proof (and, when used, key-status records and witness cosignatures), such that verification of log inclusion and signature integrity can be performed without online communication with a provider backend system.

Evidence bundle cache/service (non-limiting). In certain embodiments, an evidence bundle cache or service stores and serves evidence bundles comprising checkpoints, inclusion proofs, key-status records, and/or witness cosignatures, enabling offline-capable verification by distributing or locally caching such bundles for later use.

Cross-rail safety receipt binding (non-limiting). In certain embodiments, a verifiable inference credential record and/or an evidence bundle further includes an evidentiary cross-rail reference to a permit outcome and/or a safety receipt issued by an external permit-before-action governance layer for the same AI episode, such that an auditor can jointly verify (i) content-resident provenance under VIC-WM and (ii) permit-before-action governance evidence under the external layer, while preserving a baseline content-only, offline-capable verification path for VIC-WM.

All embodiments, components, parameter values, schema fields, and examples herein are illustrative and non-limiting. The invention is defined by the claims. Alternative embodiments and combinations are explicitly contemplated.

BRIEF DESCRIPTION OF THE DRAWINGS

FIG. 2 illustrates a generation pipeline flow including inference request receipt, activation sampling, projection and error-correcting encoding to form an activation digest, commitment generation, session key derivation, dual-channel watermark embedding, credential record generation, logging, and publishing.

DEFINITIONS AND TERMINOLOGY (SEE APPENDIX A)

Figure 1:
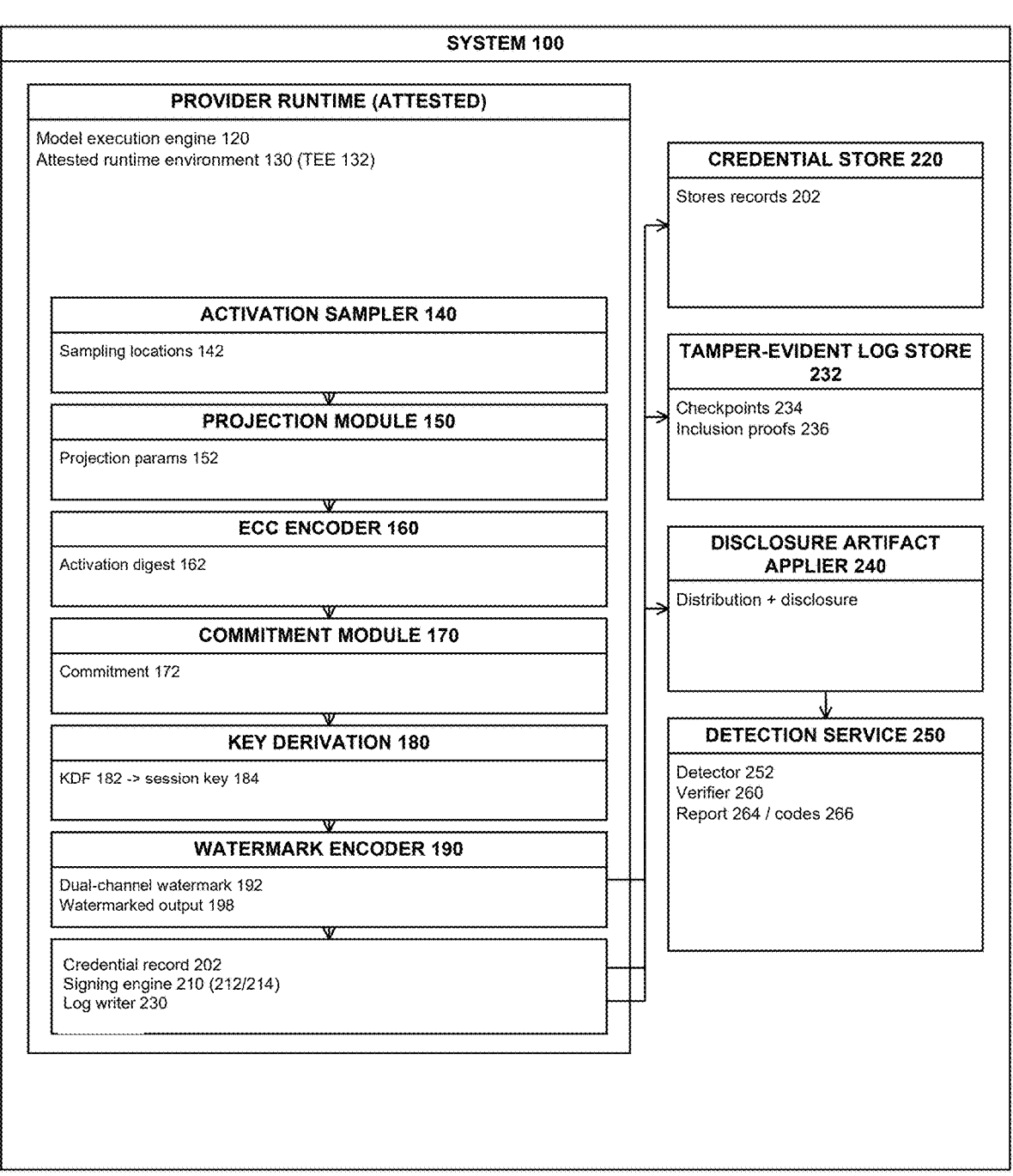
FIG. 1 illustrates an overall system architecture including a provider runtime, credential store, tamper-evident log store, distributor system, and detection service.
Figure 3:
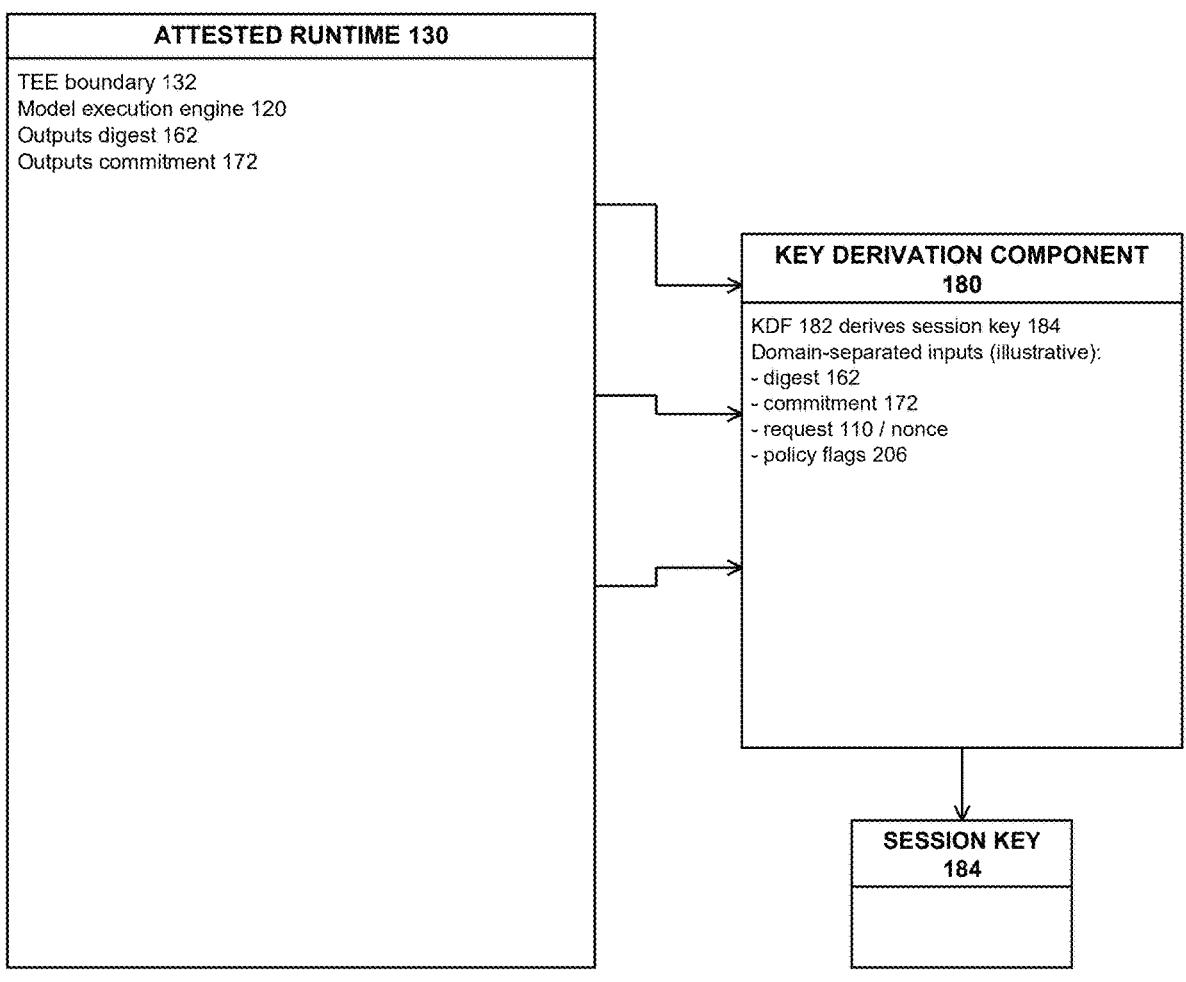
FIG. 3 illustrates an attested runtime environment, attestation validation, and key derivation with inference context inputs and domain separation.
Figure 4:
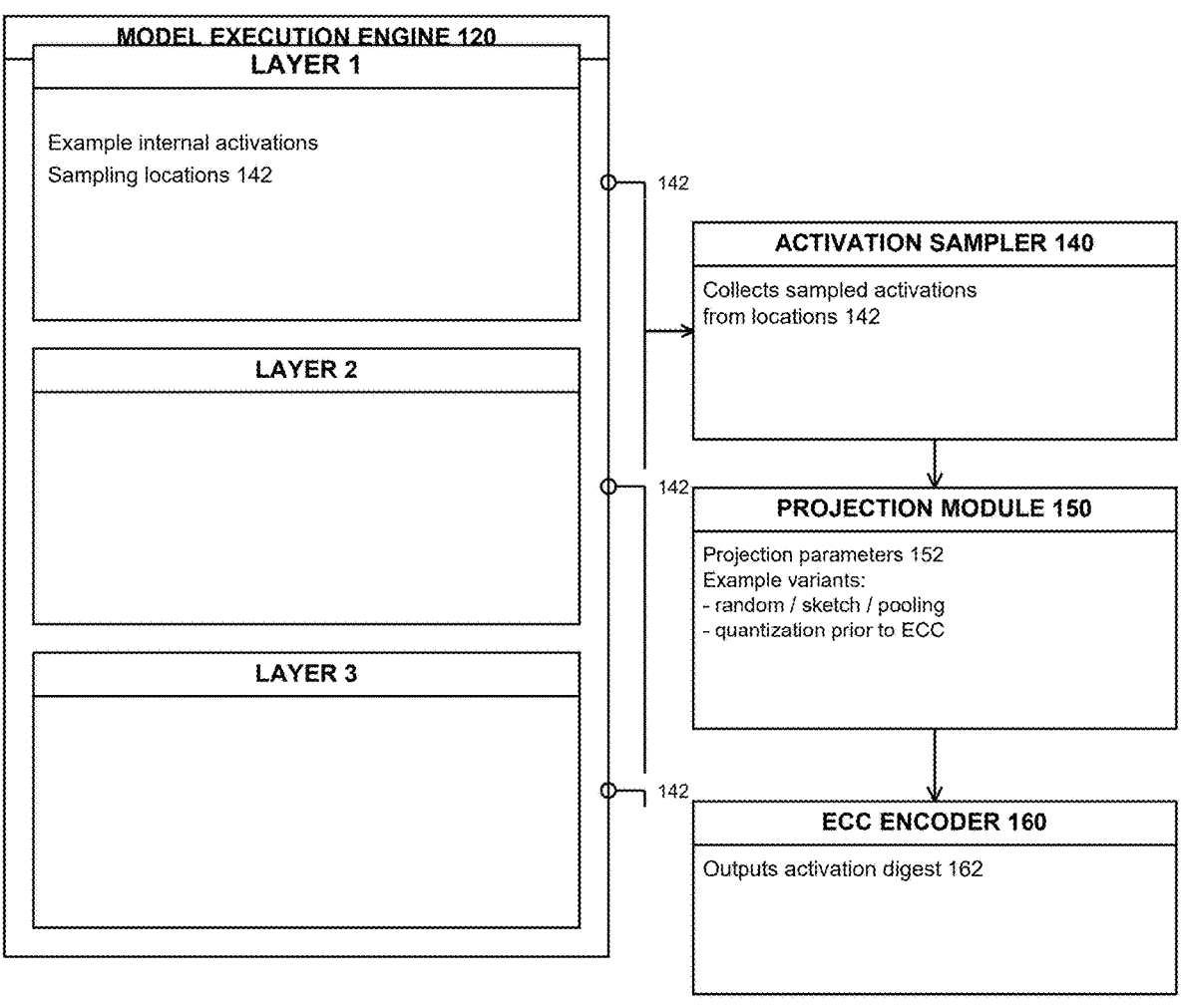
FIG. 4 illustrates sampling locations for internal activations and example projection module variants.
Figure 5:
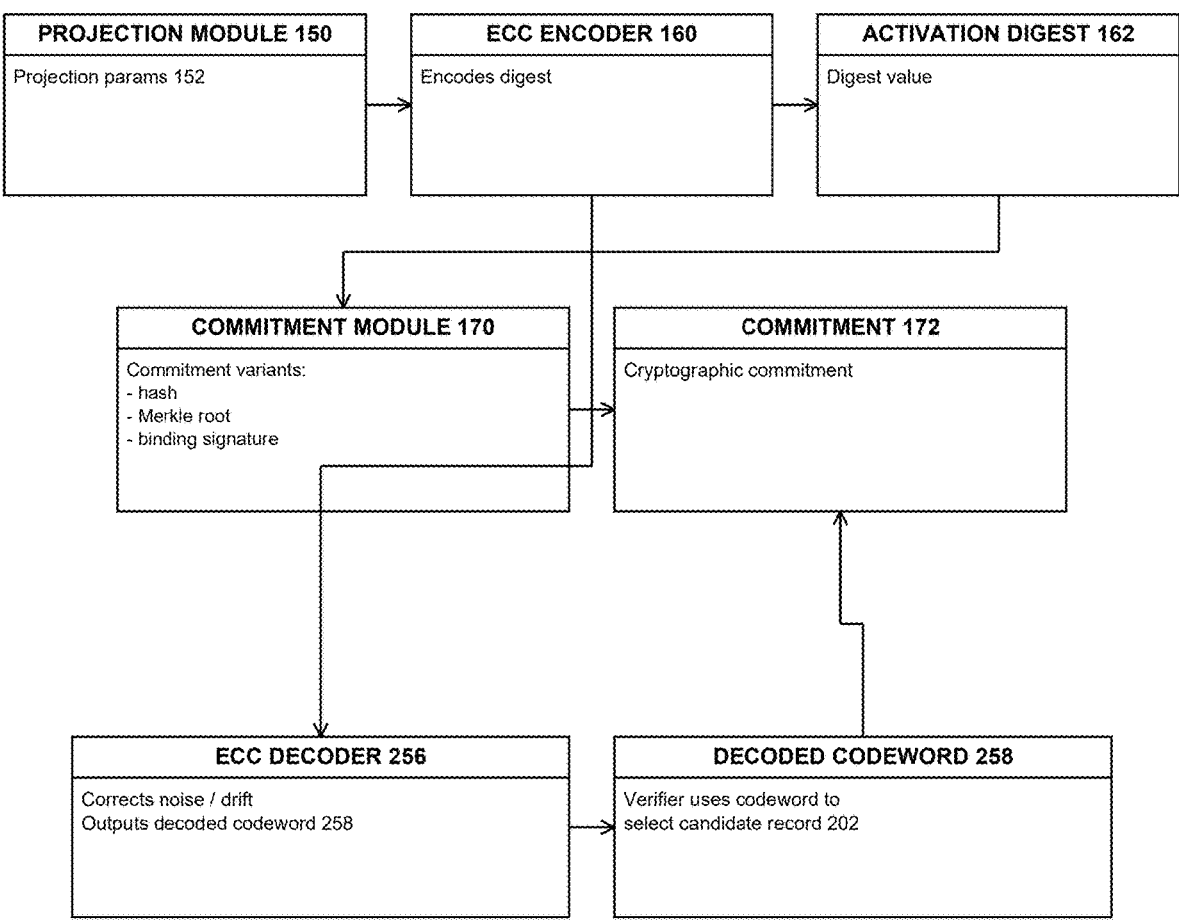
FIG. 5 illustrates activation digest construction and the relationship between an error-correcting encoder and decoder, and example commitment variants.
Figure 6:
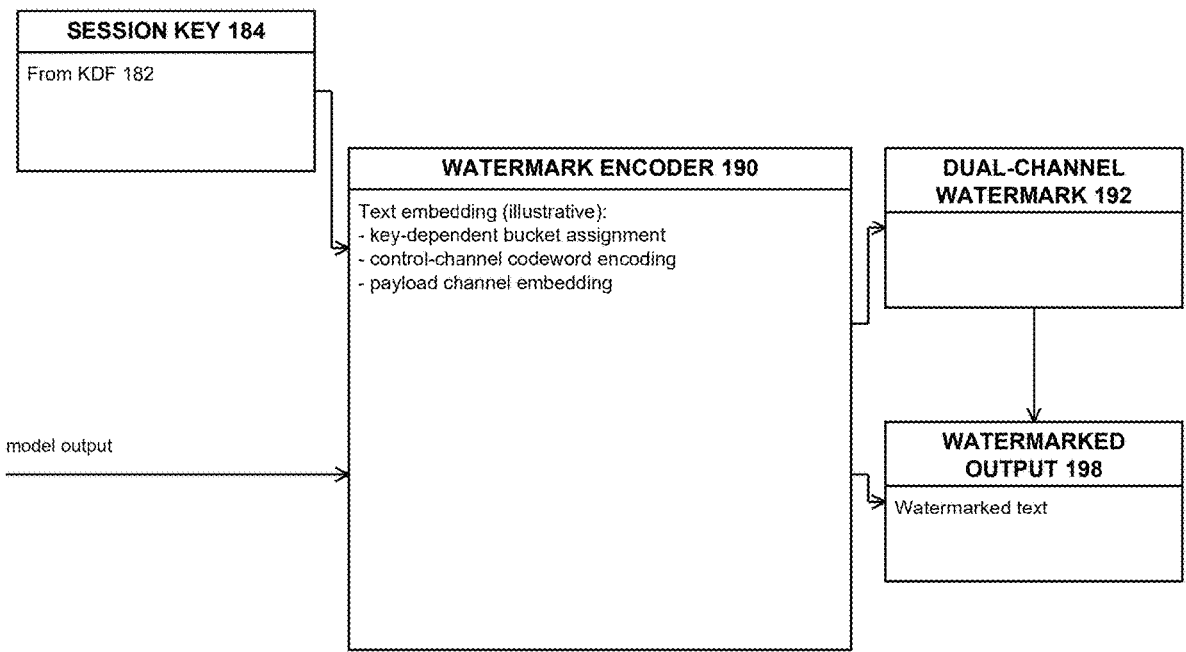
FIG. 6 illustrates text watermark embedding using key-dependent bucket assignments and control-channel codeword encoding.
Figure 7:
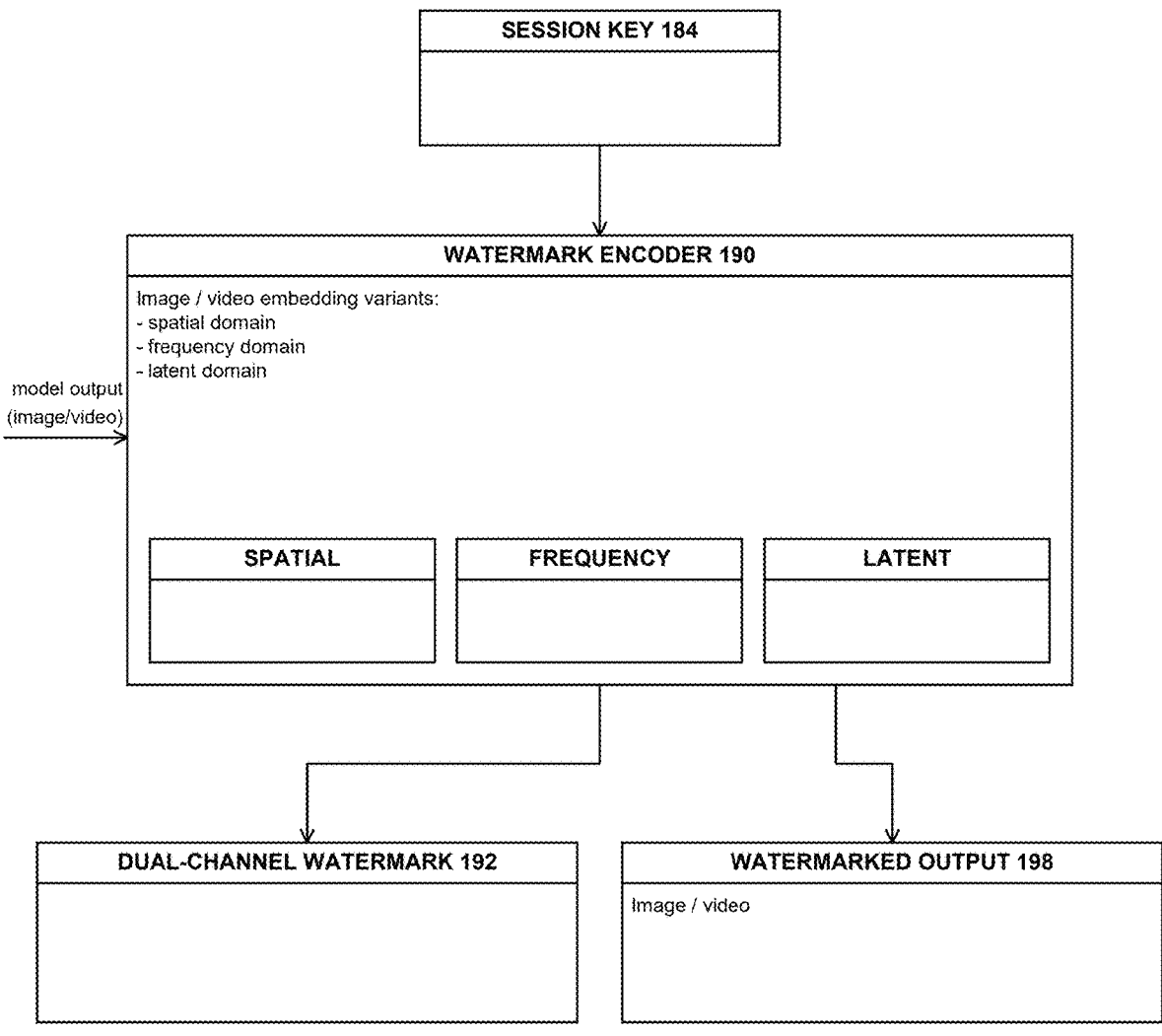
FIG. 7 illustrates image and video watermark embedding variants in spatial, frequency, or latent domains.
Figure 8:
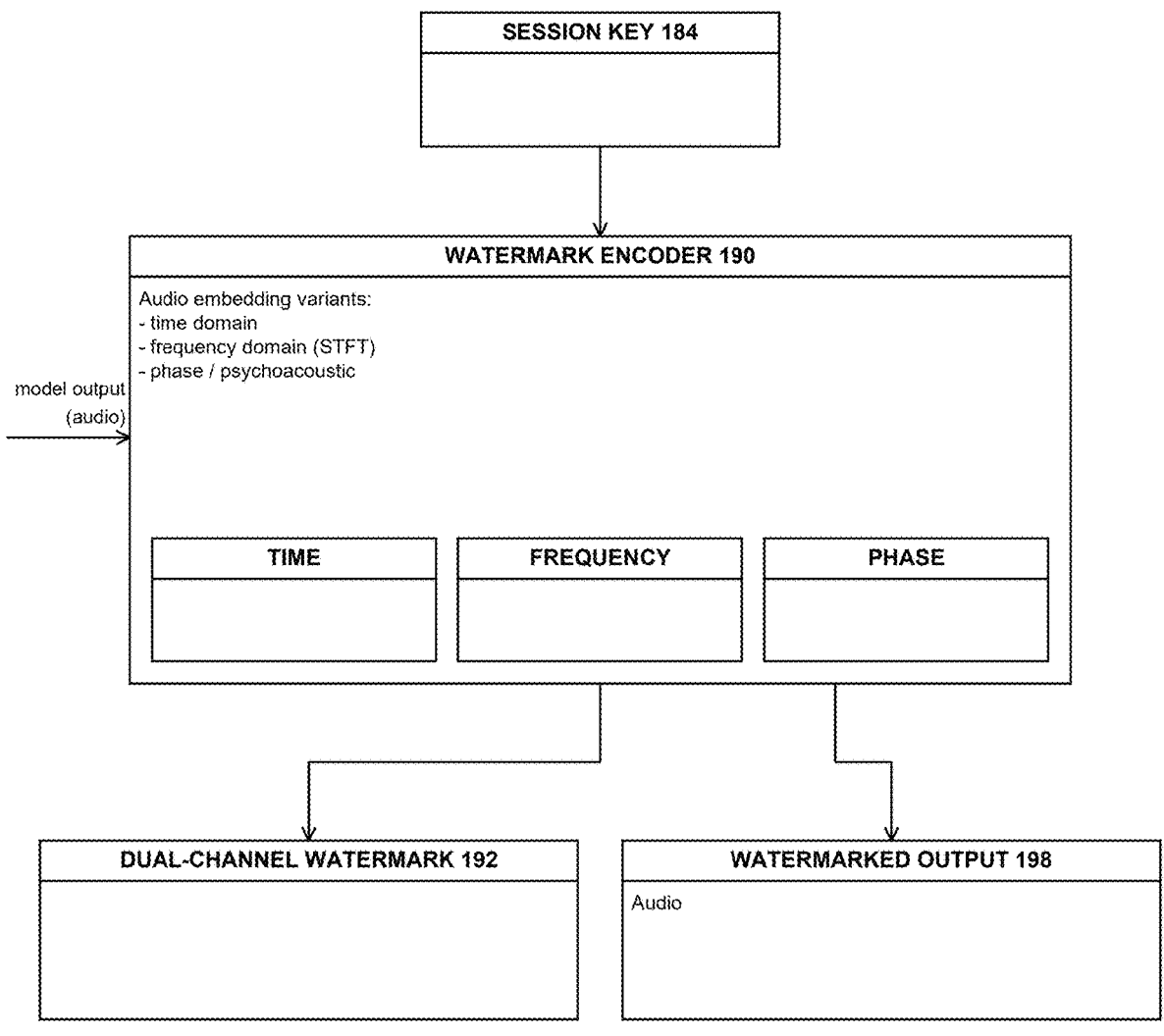
FIG. 8 illustrates audio watermark embedding variants in time, frequency, or phase domains.

This section introduces canonical terms used throughout the specification and the claims. A consolidated glossary is provided in Appendix A. Unless otherwise stated, terms are used in a non-limiting manner and may encompass functional equivalents and variants.

"Execution environment" refers to a hardware/software context in which inference is executed and in which internal activations and/or other internal execution signals are produced, and may include, comprise, or interoperate with an attested runtime environment (e.g., a TEE, confidential VM, enclave, or measured boot chain) and/or one or more non-attested components (e.g., drivers, kernels, accelerators, middleware, and associated configuration) that affect model execution, watermark embedding, credential generation, and/or logging.

As used herein, the terms "module," "logic," "engine," "component," and "interface" are used interchangeably to refer to hardware, software, firmware, or any combination thereof configured to perform the described functions, and do not require any particular partitioning, encapsulation, or implementation form.

"Attested runtime environment" refers to a runtime environment (e.g., a trusted execution environment (TEE) 132, a confidential virtual machine, a hardware-backed enclave, or a measured boot chain) for which integrity can be evidenced by an attestation report 134 and corresponding attestation data 136.

"Attestation data" refers to data derived from, or including, fields of an attestation report 134 that describes integrity of at least a portion of the runtime used to execute an artificial intelligence model. Example fields include measurements of code or configuration, signer identity, freshness values (nonce or timestamp), policy identifiers, and coverage descriptors indicating what portions are measured.

"Internal activations" refer to intermediate values produced during execution of a model, including but not limited to hidden states, attention activations, feature maps, logits, intermediate layer outputs, or other internal representations. "Sampling locations" 142 refer to one or more points in model execution (e.g., layer indices, token positions, frame indices, or time windows) from which internal activations are sampled by an activation sampler 140.

As used herein, "internal execution signals" refers to any intermediate model-internal representations or statistics observed during inference, including internal activations, hidden states, attention maps or scores, logits, decoder states, latent feature maps, intermediate embeddings, and modality-specific feature tensors. References to "activations" in this disclosure are illustrative and encompass such internal execution signals unless the context requires otherwise.

"Projection" refers to mapping sampled internal activations to a lower-dimensional representation using a projection module 150 and parameters or matrix 152. Projection may be fixed, randomized, learned, keyed, or otherwise parameterized, and may produce a sketch, embedding, or compressed representation.

In non-limiting embodiments, projection may be implemented using seeded transforms such as random projection matrices, structured Johnson-Lindenstrauss transforms, or learned compressive mappings configured to preserve selected similarity or distance properties with high probability while reducing dimensionality.

"Error-correcting encoding" refers to applying an error-correcting encoder 160 to a representation to produce a codeword configured to allow recovery under noise or distortions using a corresponding error-correcting decoder 256. In certain embodiments, the encoded output is referred to as an activation digest 162.

"Activation digest" refers to a digest computed from sampled internal activations, for example by projection and error-correcting encoding, and optionally by additional hashing and/or salting. An activation digest may be configured to be robust to minor computational variability and to satisfy privacy constraints, including limiting information leakage about sampled activations.

"Cryptographic commitment" 172 refers to a commitment to a value (e.g., the activation digest 162) that is binding and, in some embodiments, hiding, such that the committed value can later be verified without necessarily revealing the value itself. A digest commitment module 170 generates such commitments.

Non-limiting commitment schemes include hash-based commitments (optionally salted), Pedersen-style hiding commitments, and polynomial commitments. Commitment parameters and salts may be selected to support later verification and, where desired, selective disclosure of subsets of metadata while maintaining binding to the activation digest.

"Session key" 184 refers to a key derived by a key derivation component 180 using a key derivation function (KDF) 182 over inputs comprising at least an activation digest 162 and a domain-separation label, and, in certain embodiments, further comprising inference context data (e.g., distribution channel identifier, policy profile identifier or digest, and/or time-window identifier), and, when available, validated attestation data 136 or a digest derived therefrom, such that watermark embedding and related keyed operations can be bound to an inference event and, optionally, to runtime integrity with domain separation.

Key derivation function breadth (non-limiting). In certain embodiments, a key derivation function includes any cryptographic derivation procedure, including hash-based derivation, PRF/HKDF-style derivation, and equivalent constructions that derive key material from the referenced inputs.

In certain embodiments, the KDF inputs further comprise a digest and/or identifier derived from an external governance receipt or permit outcome for the same AI episode (e.g., a safety_receipt_digest or permit_outcome_digest), such that derived key material can optionally be bound to the referenced governance evidence without requiring disclosure of the underlying receipt contents.

"Dual-channel watermark" 192 refers to a watermark comprising (i) a payload channel 194 configured to support statistical detection (e.g., a payload statistic 254) and (ii) a control-channel codeword 196 configured to be decoded (e.g., by ECC decoder 256) to support determination of a candidate credential record and a candidate commitment for verification. The dual-channel watermark may be embedded using a watermark encoder 190 to produce a watermarked output 198.

"Verifiable inference credential record" 202 refers to a structured record generated by a credential generator 200 comprising at least (i) a cryptographic commitment 172 to an activation digest and (ii) metadata 204 describing at least a watermarked output. In certain embodiments, the record includes policy flags 206, transparency metadata 208, detector profile references, and digital signatures (e.g., provider signature 212 and, when present, distributor signature 214). In certain embodiments, the record further includes or references a canonical commitment representation and/or a signed key-status record for a signing key used to verify the record.

As used herein, "credential record" refers to a "verifiable inference credential record" unless the context indicates otherwise, and "candidate credential record" refers to a candidate verifiable inference credential record determined for verification based at least on a decoded control-channel codeword.

"Tamper-evident log store" 232 refers to a data structure that enables detection of omission, modification, or equivocation of log entries, for example using Merkle trees and transparency checkpoints 234 with anchoring and inclusion proofs 236. In some embodiments, checkpoints are cosigned by one or more witnesses. In certain embodiments, checkpoints and witness cosignatures are configured to detect equivocation and checkpoint rollback across publication surfaces.

Append-only verifiable log and signed-head equivalence (non-limiting). In certain embodiments, a tamper-evident log store is implemented as an append-only verifiable log that publishes signed heads together with inclusion proofs and, in some embodiments, consistency proofs upon head advance. In such embodiments, a "transparency checkpoint"

may comprise or be represented as a "signed head," and inclusion/consistency proof semantics apply to either representation.

Maximum-merge-delay (MMD) freshness policy (non-limiting). "Maximum-merge-delay (MMD)" refers to a freshness policy for an append-only verifiable log that bounds a maximum time and/or maximum number of operations between acceptance of an entry (or a digest derived therefrom) and publication of a signed head under which that entry is provably included.

Status tuple/status stapling (non-limiting). "Status tuple" refers to a freshness descriptor derived from an anchoring event in an append-only verifiable log, including at least a signed_head_id, a head_timestamp, and a staleness_interval (e.g., staleness_interval_ms). In certain embodiments, "status stapling" refers to recording such a status tuple in a credential record and/or evidence bundle so that downstream verifiers can reassess MMD freshness and log consistency at review time without re-running an anchoring protocol. Status stapling is evidentiary only and does not alter watermark embedding, detection thresholds, or other VIC-WM semantics; the claims control.

Cross-rail reference (non-limiting). "Cross-rail reference" refers to an optional evidentiary pointer in a credential record and/or evidence bundle to one or more external governance receipts or safety receipts associated with the same AI episode, including without limitation a safety_receipt_ref, a permit outcome, and one or more of a policy digest, a policy signature, a validity interval, a revocation reference, and/or a status tuple. Cross-rail references are evidentiary only and do not alter VIC-WM watermarking or verification semantics.

"Disclosure artifact" refers to a human-perceivable disclosure applied to an external representation of content, such as a visible badge 242, caption/banner/overlay 244, or audible disclosure tag 246, applied by a disclosure artifact applier 240 under a policy profile.

"From content alone" refers to verification or detection operations that compute at least a payload statistic and attempt control-channel decoding using the content itself without requiring online communication with a provider backend system, though optional online enhancements may be used in certain embodiments.

"Detector profile" refers to a versioned profile describing detection parameters, including supported modalities, payload statistics and thresholds, control-channel decoding parameters, and associated identifiers (e.g., detector_profile_id and watermark_profile_id).

Normalization profile (non-limiting). "Normalization profile" refers to a versioned specification of one or more canonicalization and/or normalization procedures applied prior to hashing, decoding, digest computation, or verification, including modality-specific procedures for text, image/video, and audio.

Normalization version digest (non-limiting). "Normalization version digest" refers to a cryptographic digest computed over a canonicalized representation of at least a portion of a normalization profile, usable to ensure that verifiers apply consistent normalization when computing payload statistics, control-channel decoding, disclosure evidence digests, or other verification artifacts.

"Predetermined detection threshold" refers to a threshold value associated with a detector profile and used to determine whether a payload statistic indicates watermark presence, in some embodiments, calibrated to a target false-positive rate.

"Policy profile" refers to a versioned configuration that specifies disclosure requirements, robustness settings, detector profiles, and/or operational parameters for a distribution context.

"Policy profile digest" refers to a cryptographic digest computed over a canonicalized representation of at least a portion of a policy profile (e.g., versioned rules and parameters), such that a verifier can confirm policy identity and version (and/or integrity of the referenced policy configuration) without retrieving the entire policy profile. In non-limiting embodiments, the policy profile digest may comprise a hash of a canonical encoding of the policy profile (or a selected subset thereof) and may be included in, referenced by, or used to bind operations within credential records, distributor preservation signatures, and/or key-derivation inputs.

"Signed key-status record" refers to a signed statement indicating a status of a signing key (e.g., active, revoked, stale) usable by a verifier without online communication in certain embodiments.

"Canonical commitment representation" refers to a deterministic representation of a commitment value and associated scheme parameters sufficient to enable consistent verification across implementations.

Detection-attribution separation (non-limiting). In certain embodiments, watermark verification uses separate algorithms and/or separate keys for (i) robust detection and (ii) attribution or issuer binding. In such embodiments, a verifier may apply a detection algorithm and a detection key to determine watermark presence under transformations, and may apply an attribution algorithm and an attribution key to determine an issuer, model family, or provenance binding with stronger unforgeability properties. In certain embodiments, a single watermark generation procedure supports later selection of a detection path and/or an attribution path depending on a policy profile, jurisdiction, or audit context. These embodiments are illustrative and do not limit the claims.

"Disclosure evidence digest" refers to a cryptographic digest derived from a disclosed representation and/or rendering parameters of a human-perceivable disclosure artifact, usable to verify preservation of the disclosure artifact for a distribution channel.

SYSTEM OVER VIEW AND HIGH-LEVEL ARCHITECTURE (FIG. 1)

FIG. 1 illustrates an example system 100 for labeling machine-generated content. The system 100 may include a model execution engine 120 that, in certain embodiments, operates at least in part within an attested runtime environment 130, and, in other embodiments, operates outside the attested runtime environment 130 while interoperating with one or more components configured for attestation, activation sampling, projection/encoding, key derivation, watermarking, credential generation, signing, and/or transparency logging. The attested runtime environment 130 may include, for example, a trusted execution environment (TEE) 132, a confidential virtual machine, a hardware-backed enclave, and/or a measured-boot chain, configured to isolate and/or protect code and data used for one or more of inference, watermarking, and credential generation.

An inference request 110 including a model input 112 is received by the model execution engine 120. During inference, an activation sampler 140 samples internal activations (and/or other internal execution signals) at one or more sampling locations 142. A projection module 150 maps sampled activations to a lower-dimensional representation using projection parameters or matrix 152, and an error-correcting encoder 160 encodes the representation to produce an activation digest 162. In certain embodiments, sampling locations, projection parameters, and/or encoding parameters are selected according to a policy profile and/or other configuration values to balance robustness, overhead, and privacy.

A digest commitment module 170 generates a cryptographic commitment 172 to the activation digest 162. A key derivation component 180 derives a session key 184 using a key derivation function (KDF) 182 over inputs comprising at least the activation digest 162 and, in certain embodiments, inference context data and a domain-separation label, and, when available, attestation data 136 (or selected fields or digests derived therefrom) to optionally bind watermarking to runtime integrity. A watermark encoder 190 embeds a dual-channel watermark 192 into content generated by the model, during generation, as post-processing, or both, to produce a watermarked output 198, wherein the dual-channel watermark 192 includes a payload channel and a control-channel codeword.

A credential generator 200 generates a verifiable inference credential record 202 comprising the cryptographic commitment 172 and output metadata 204. In certain embodiments, the record includes policy flags 206, transparency metadata 208, and detector profile references, and is signed by a signing engine 210 producing a provider signature 212. The record may be stored in a credential store 220.

A log writer 230 writes log entries to a tamper-evident log store 232. The log store 232 may periodically produce transparency checkpoints 234 and inclusion proofs 236. In some embodiments, checkpoints are anchored externally and cosigned by one or more witnesses. A distributor system may apply disclosure artifacts via a disclosure artifact applier 240 and may apply a distributor signature 214 attesting preservation of required disclosure artifacts for a given distribution channel.

The watermark, credential record, and transparency logging are cooperative components of a single verification rail: the watermark provides content-resident signals, the credential binds those signals to an inference event via a commitment, and the log provides tamper-evident publication and inclusion verification for audit and enforcement.

A detection service 250 may include a watermark detector 252 and a credential verifier 260. The detection service 250 may operate on input content to compute a payload statistic 254, decode a control-channel codeword, determine a candidate credential record and/or candidate commitment, verify signatures, log inclusion, key-status records in some embodiments, and disclosure preservation when present, and output a provenance report 264 with reason codes from a reason code set 266.

ATTESTED RUNTIME ENVIRONMENT AND ATTESTATION DATA (FIG. 3)

In certain embodiments, inference, watermarking, and credential generation are performed at least in part within a TEE 132 of an attested runtime environment 130. The TEE 132 may provide isolation such that code and data for sampling, projection, encoding, key derivation, watermarking, and credential generation are protected from modification or observation by untrusted components.

The attested runtime environment 130 may generate an attestation report 134 that includes measurements of at least a portion of the runtime environment used to execute the artificial intelligence model. The attestation report 134 may be validated by an attestation verifier (e.g., within the provider backend) to produce validated attestation data 136.

The attestation data 136 may describe integrity of at least: (i) the model binary or weights, (ii) the watermark encoder 190, (iii) the activation sampler 140 and projection module 150, (iv) key derivation logic, and/or (v) configuration values governing sampling locations 142 and robustness settings. Coverage may be explicit, such as by listing measured modules or digests.

Freshness may be enforced using a nonce, timestamp, monotonic counter, or challenge-response included in the attestation report 134. In certain embodiments, attestation validation includes verifying that the report is signed by an approved attestation authority, that measurements match an allowlist, and that freshness requirements are met.

Attestation data used for key derivation may be derived from the validated report (e.g., selected fields or digests). In certain embodiments, only a portion of attestation data is used, enabling flexible selection of integrity bindings without requiring an entire report to be incorporated into key derivation.

ACTIVATION SAMPLING, PROJECTION, AND ACTIVATION DIGEST CONSTRUCTION (FIGS. 4-5)

During model execution, the activation sampler 140 samples internal activations at one or more sampling locations 142. Sampling locations may be predetermined, model-family-specific, randomly selected, keyed by session key material, or selected according to a policy profile that trades off robustness, overhead, and privacy.

For a language model, sampling locations may include selected transformer layers and token positions; for an image or video model, sampling locations may include selected convolution blocks, attention blocks, or latent feature maps; and for an audio model, sampling locations may include selected time-frequency representations or intermediate embeddings.

The projection module 150 projects sampled activations to a lower-dimensional representation. Projection may include random projection with a seeded matrix, principal component projection, learned linear projection, sketching (e.g., count-sketch), or quantization-based compression. In certain embodiments, projection parameters 152 are fixed for a model family; in other embodiments, they are keyed, periodically rotated, or derived from attestation data.

The error-correcting encoder 160 encodes the projected representation to produce an activation digest 162. Error-correcting encoding may be used to improve robustness to minor runtime variability and support recoverability under noise or distortion for control-channel operations.

Non-limiting examples of error-correcting codes include BCH codes, Reed-Solomon codes, low-density parity-check (LDPC) codes, convolutional codes, and concatenated codes. Code parameters may be selected to trade off redundancy, decoding complexity, and robustness across modalities and transformations.

In certain embodiments, the activation digest 162 is a codeword or a concatenation of codewords, optionally further processed using hashing and/or salting. In other embodiments, the activation digest 162 includes multiple segments corresponding to different sampling locations or modalities, each encoded with potentially distinct ECC parameters.

Privacy constraints may be enforced by limiting the information content of the activation digest 162. For example, projection may be lossy, quantized, or randomized, and the commitment may be hiding, such that the credential record does not enable reconstruction of sampled internal activations beyond a predetermined information-leakage bound.

SESSION KEY DERIVATION AND KEY MANAGEMENT (FIGS. 3, 13)

The key derivation component 180 derives a session key 184 using a key derivation function (KDF) 182 over inputs comprising at least the activation digest 162, inference context data from an inference context store, and a domain-separation label. In certain embodiments, when validated attestation data 136 is available, the KDF 182 further incorporates at least a portion of the attestation data 136 (or a digest derived therefrom) to optionally bind watermarking to runtime integrity. In certain embodiments, the inference context data includes at least one of a distribution channel identifier, a policy profile identifier (or digest), or a time-window identifier, such that derived keys are channel-specific, policy-specific, and/or time-window-specific.

In certain embodiments, the inference context data further comprises or references a digest and/or identifier derived from an external governance receipt or permit outcome for the same AI episode (e.g., a safety_receipt_digest or permit_outcome_digest), such that session keys can optionally be bound to the referenced permit evidence with domain separation.

In some embodiments, attested runtime information may be unavailable, optional, or intentionally omitted for certain deployments. In such cases, the session key 184 may be derived from the activation digest 162 alone, or from the activation digest 162 together with inference context data and a domain-separation label, while omitting attestation fields.

Domain separation may be used such that distinct derived keys are used for distinct purposes, for example: (i) watermark embedding keys, (ii) control-channel mapping keys, (iii) disclosure artifact selection keys, and (iv) other keyed operations. Domain separation may be implemented via KDF labels, salts, or context strings.

Key rotation and revocation may be supported by a revocation/rotation service 270. Rotation and revocation events may be recorded in the tamper-evident log store 232 and/or in the credential store 220. In certain embodiments, verification logic consults a revocation list, checkpointed policy digest, or a signed key-status record.

In certain embodiments, the session key 184 is not stored persistently and is derived on demand. In other embodiments, the session key or derived subkeys may be cached for the duration of a session under access controls within a TEE 132.

Multi-tenant keys and identification (non-limiting). In certain embodiments, different distribution channels, tenants, accounts, or user cohorts are assigned distinct keys, signatures, or policy profiles, and detection/verification performs multiple-hypothesis handling (e.g., threshold adjustment, correction, or policy-specified decisioning) when evaluating candidate records or candidate commitments across multiple possible issuers or keys.

Two-stage candidate reduction and fallback search (non-limiting). In certain embodiments, candidate determination is performed in multiple stages, including a first-stage recovery of a coarse identifier (e.g., a group identifier, prefix, or other compact selector) embedded in content-resident signals, followed by a second-stage search over a reduced candidate set. In certain embodiments, when the first-stage identifier is degraded by transformations or attacks, verification performs a fallback search over a larger candidate set (including, in some embodiments, a full search) and records a corresponding reason code. These embodiments are illustrative and non-limiting.

DUAL-CHANNEL WATERMARK EMBEDDING (TEXT, IMAGE/VIDEO, AUDIO) (FIGS. 6-8)

A watermark encoder 190 embeds a dual-channel watermark 192 into content generated by a model, parameterized by the session key 184, to produce a watermarked output 198. The dual-channel watermark 192 includes a payload channel 194 and a control-channel codeword 196. The payload channel supports statistical detection, while the control-channel codeword supports candidate credential and/or commitment determination and subsequent verification.

Text watermarking embodiments may embed watermark information by biasing token selection probabilities during generation. For example, a keyed bucket assignment partitions candidate tokens into buckets based on the session key 184, and bits of the control-channel codeword 196 are encoded by selecting tokens consistent with target buckets. The payload channel may be represented by a measurable deviation in bucket hit rates relative to an unwatermarked baseline, evaluated using a detector profile.

Entropy-adaptive embedding (non-limiting). In certain embodiments, text watermark embedding is applied adaptively based on an estimated entropy, confidence, or "spike" property of the model's next-token distribution, such that watermark strength is increased when multiple high-quality token choices are available and reduced when the distribution is highly peaked. In certain embodiments, a decoder search procedure (e.g., beam search or constrained decoding) is used to select among candidate sequences to increase control-channel decodability and payload detection confidence while limiting quality degradation.

Protected-span and precision-token handling (non-limiting). In certain embodiments, watermark embedding is constrained by a policy profile to avoid modifying protected spans and/or precision-critical tokens (e.g., numeric values, dates, dosages, legal citations, identifiers, or other integrity-sensitive content). In such embodiments, embedding is applied preferentially to higher-entropy positions outside protected spans, and a protected-span mask identifier and/or digest may be recorded in the credential record and/or detector profile to support consistent verification and auditing. These embodiments are illustrative and do not limit the claims.

Image and video watermarking embodiments may embed the dual-channel watermark in one or more domains, including spatial-domain perturbations, frequency-domain coefficients, or latent representations produced by generative models. The session key 184 may parameterize pseudo-random patterns, coefficient selection, or spread-spectrum sequences. The control-channel codeword 196 may be embedded redundantly across patches, frames, or frequency bands to support ECC decoding after transformations.

In certain embodiments, watermark embedding is applied to intermediate or latent representations rather than only final output tokens, pixels, or samples, provided that the resulting external content exhibits the dual-channel watermark statistics and supports control-channel decoding.

Audio watermarking embodiments may embed the dual-channel watermark in time-domain samples, frequency-domain coefficients, or phase-domain representations. The session key 184 may parameterize band selection and spreading sequences. Control-channel redundancy may be used across time windows or bands to support decoding under compression or re-encoding.

In non-limiting audio embodiments, embedding may be guided by psychoacoustic criteria, such as selecting time-frequency regions masked by other sounds and encoding payload and control-channel information via small magnitude or phase perturbations configured to remain imperceptible while surviving compression and re-encoding.

In certain embodiments, embedding is performed during model generation and/or as post-processing applied to already-generated output, including hybrid approaches.

Robustness settings may be selected to ensure that the watermark remains detectable, with a payload channel statistic exceeding a predetermined detection threshold, after one or more content-preserving transformations such as paraphrasing, cropping, scaling, lossy re-encoding, and format conversion. Such settings may be expressed as a policy profile or configuration tied to a distribution channel.

Figure 9:
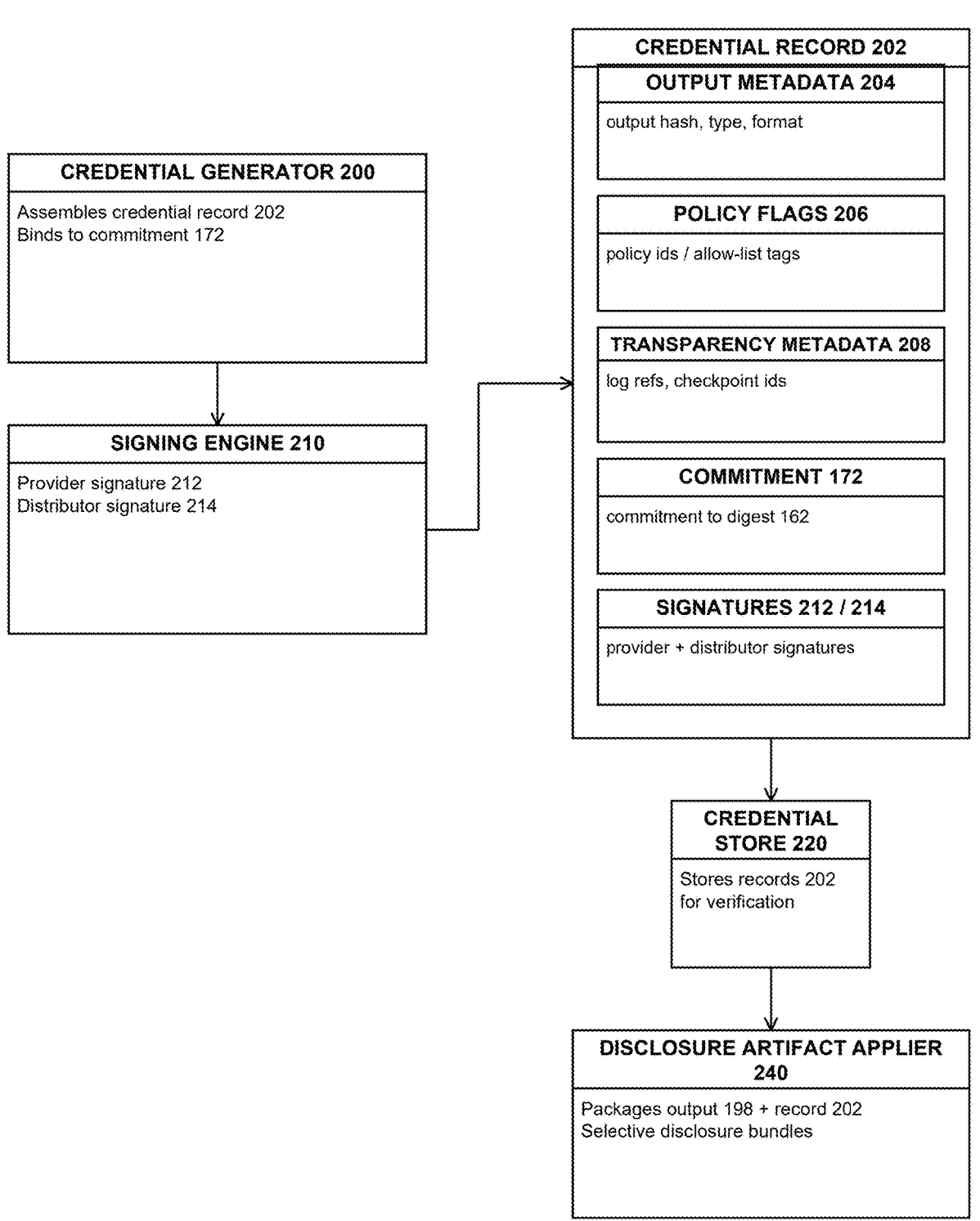
FIG. 9 illustrates a verifiable inference credential record schema, provider signing, detector profile references, and manifest packaging with selective disclosure bundles.
Figure 10:
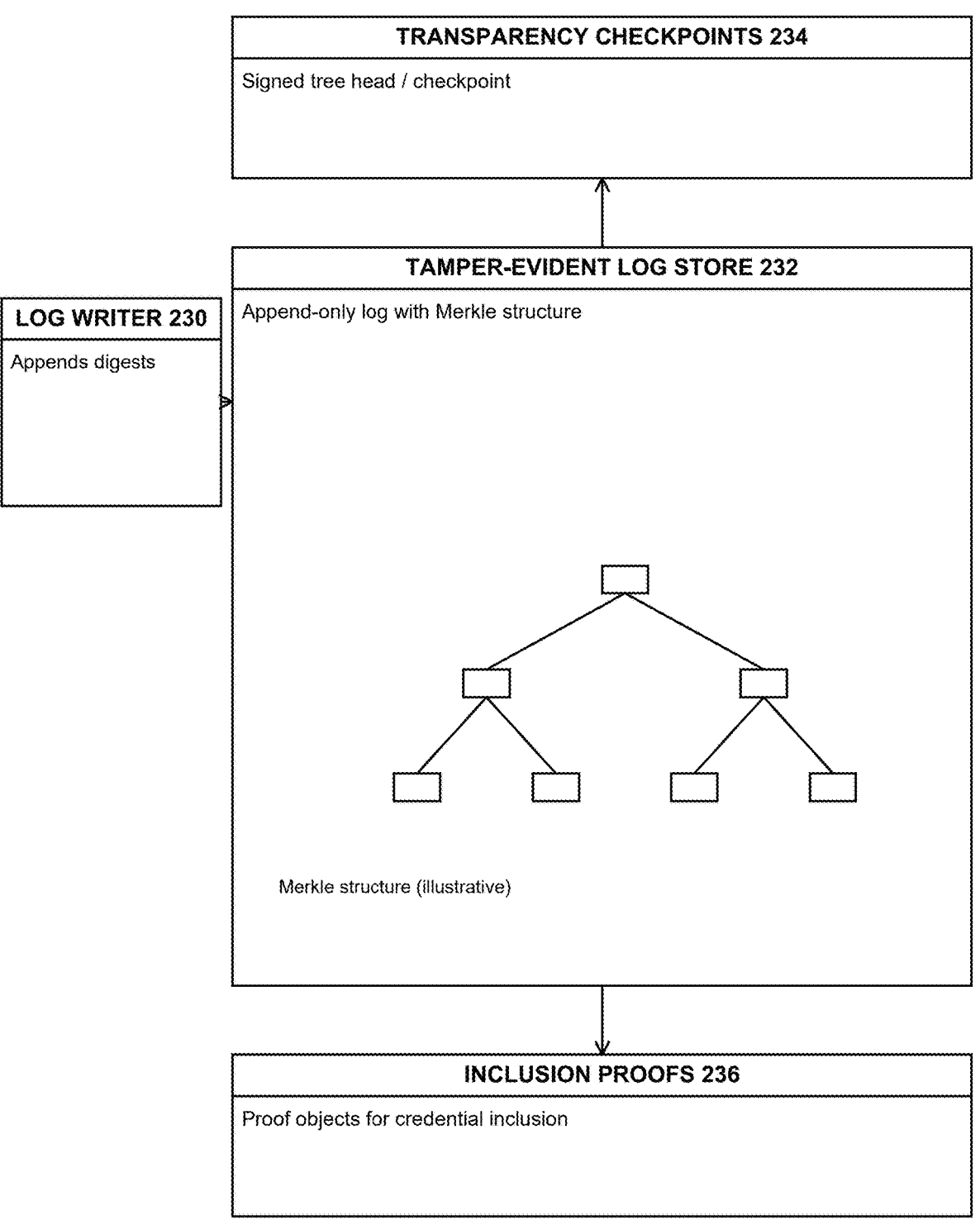
FIG. 10 illustrates a tamper-evident log store, Merkle structures, transparency checkpoints, anchoring, witness cosignatures, and inclusion proofs.

VERIFIABLE INFERENCE CREDENTIAL RECORD (COMMITMENT, METADATA, SIGNATURES, PRIVACY) (FIG. 9)

The credential generator 200 generates a verifiable inference credential record 202 comprising a cryptographic commitment 172 to the activation digest 162 and output metadata 204 describing at least a watermarked output. Output metadata 204 may include a content hash, content identifier, output modality, model family identifier, provider identifier, inference time window, and distribution channel identifier.

In certain embodiments, the credential record 202 includes policy flags 206 indicating that specified policies or compliance checks were applied. Non-limiting examples include disclosure-required flags, safety-filter-applied flags, policy-profile identifiers, and jurisdictional compliance indicators.

In certain embodiments, the credential record 202 includes transparency metadata 208 including one or more of: notice_event_id; notice_surface_id; notice_version_digest; disclosure_mode; and accessibility_label. In some embodiments, the record further includes detector profile references (e.g., detector_profile_id and watermark_profile_id) and/or a detection-threshold identifier corresponding to a target false-positive rate.

The credential record 202 may be signed by a signing engine 210 using a provider signing key to produce a provider signature 212. The record may be stored in a credential store 220. In certain embodiments, the credential store is indexed by a value derived from the control-channel codeword 196 to enable efficient lookup during content-only detection.

The credential record 202 may be encoded in a manifest format suitable for attachment as metadata to a file containing the watermarked output 198, including as embedded container metadata and/or as a sidecar file. In certain embodiments, the manifest supports selective disclosure, allowing a verifier to validate a provider signature and log inclusion without revealing all metadata fields and/or without revealing the committed activation digest.

In certain embodiments, the cryptographic commitment 172 is configured such that it does not enable reconstruction of sampled internal activations beyond a predetermined information-leakage bound.

Cross-rail governance binding fields (non-limiting). In certain embodiments, the credential record 202 includes or references a cross-rail governance binding object that evidences a permit-before-action decision for the same AI episode, including without limitation one or more of: (i) a safety_receipt_ref identifying an external safety receipt; (ii) a permit_outcome indicating an allowed/denied/conditional outcome (or an equivalent permit disposition); (iii) a policy_digest and, when available, a policy_signature over a policy graph or policy profile used to evaluate the permit outcome; (iv) a permit_validity interval and/or revocation reference enabling later reassessment; and/or (v) a status tuple (e.g., signed_head_id, head_timestamp, staleness_interval_ms) derived from an anchoring event, enabling freshness reassessment at review time. In certain embodiments, the cross-rail governance binding object additionally includes or references replay-verifiable conformance receipts and/or conformance packs (e.g., RVAL) and pins, in an evidentiary-only manner, at least a policy identifier and policy version digest and a validator identifier and validator digest, and, when used, a reason-code registry identifier/digest and/or a conformance context digest (CCD) computed over a canonical encoding of committed boundary components.

Privacy-preserving linkage (non-limiting). In certain embodiments, safety_receipt_ref and related episode identifiers are pseudonymous (e.g., derived using a per-tenant keyed function such as HMAC) and are selectively disclosed such that a verifier can validate integrity and cross-rail consistency without revealing unnecessary identifying data.

TAMPER-EVIDENT LOG STORE AND TRANSPARENCY CHECKPOINTS (FIG. 10)

A log writer 230 may record, in a tamper-evident log store 232, log entries that include at least an identifier of the credential record 202 and the cryptographic commitment 172 to the activation digest 162. The log store 232 may be implemented using append-only data structures such as Merkle trees, transparency logs, or ledger-based structures.

The log store 232 may periodically produce transparency checkpoints 234 that commit to the current state of the log, and may provide inclusion proofs 236 for specific log entries. Checkpoints may be anchored by publication to an external transparency service, a widely witnessed bulletin, or other anchoring mechanism.

In certain embodiments, log entries further include policy outcomes or reason codes indicating whether a disclosure requirement was satisfied, and may include or reference key-rotation and/or revocation events associated with signing keys. Reason codes may be drawn from a reason code set 266 and may be machine-verifiable and auditable.

To mitigate equivocation, the system may publish checkpoints to multiple witnesses or maintain a witness cosignature set. In other embodiments, inclusion proofs are bound to checkpoint identifiers and anchored timestamps to detect rollback. In some embodiments, checkpoints are published to multiple independent publication surfaces and verified for monotonicity to detect rollback and equivocation.

In some embodiments, transparency checkpoints are cosigned by two or more independent witnesses to increase resistance to equivocation and checkpoint rollback.

Distributor transparency logging (non-limiting). In certain embodiments, a distributor system maintains a distributor-controlled tamper-evident log store that records disclosure-preservation evidence, including disclosure evidence digests, distributor signatures, and associated channel/policy identifiers, to support auditing and enforcement.

Consistency proofs (non-limiting). In certain embodiments, the tamper-evident log store provides, in addition to inclusion proofs, one or more consistency proofs demonstrating that a later transparency checkpoint extends an earlier checkpoint without omission, enabling detection of truncation or rollback across checkpoint sequences.

Gossip and monitoring (non-limiting). In certain embodiments, witnesses, auditors, platforms, and/or verifiers exchange ("gossip") checkpoints and/or signed log commitments and request consistency proofs to detect equivocation, split-view presentation, or checkpoint rollback across publication surfaces.

Anti-equivocation reason codes (non-limiting). In certain embodiments, provenance reports and/or compliance reports include reason codes indicating detection of checkpoint inconsistency, rollback, or equivocation and include evidence references sufficient for third-party audit.

Signed-head publication under MMD freshness (non-limiting). In certain embodiments, the tamper-evident log store provides signed heads under a maximum-merge-delay (MMD) freshness policy and provides inclusion proofs for appended entries and, in some embodiments, consistency proofs upon head advance. In such embodiments, verification of log inclusion may comprise verifying an inclusion proof against a fresh signed head (and, when present, witness cosignatures and anti-equivocation checks).

Freshness-aware verification outcomes (non-limiting). In certain embodiments, a verifier treats log-inclusion as satisfied only upon verification of an inclusion proof against a signed head (or transparency checkpoint) that satisfies an applicable freshness bound (e.g., an MMD policy). In certain embodiments, when freshness cannot be established (e.g., head is stale, unavailable, inconsistent, or equivocation is detected), the verifier outputs a HOLD/INCONCLUSIVE or FAIL outcome (as specified by a detector profile and/or policy profile) with a corresponding reason code and evidence references, rather than outputting a PASS determination.

Status stapling for offline reassessment (non-limiting). In certain embodiments, the system records, in a credential record and/or evidence bundle, a status tuple (e.g., signed_head_id, head_timestamp, staleness_interval_ms and/or an MMD identifier) derived from the anchoring event, enabling downstream verifiers to reassess freshness at review time without requiring online access to a provider backend.

PUBLISHING AND DISTRIBUTION MODELS (FIG. 11)

Publishing may include transmitting the watermarked output 198 to a client device and storing the credential record 202 in a credential store 220 associated with a provider backend. In other embodiments, publishing includes attaching the credential record as a manifest to an output file, posting the output and record to a distribution channel, and/or providing an interface for retrieving the record based on the control-channel codeword.

The specification contemplates multiple deployment topologies, including: provider-only operation; provider-plus-platform operation in which a platform distributes content and preserves disclosure artifacts; and multi-platform distribution in which multiple distributors apply preservation signatures while referencing a provider-issued credential record.

Distribution may include packaging policies that determine which metadata fields are attached to content and which are retained by a provider, and may include selective disclosure bundles enabling third-party verification with minimal disclosure.

Policy- and detector-profile publication (non-limiting). In certain embodiments, a provider and/or distributor publishes one or more policy profiles, detector profiles, watermark profiles, and/or normalization profiles to one or more publication surfaces, each profile having a profile identifier and a profile digest computed over a canonicalized representation of at least a portion of the profile.

Profile pulling and fail-closed verification (non-limiting). In certain embodiments, a verifier retrieves ("pulls") a referenced profile from a locally available profile cache and/or a publication surface, recomputes a digest over a canonicalized representation of the retrieved profile, and compares the recomputed digest to a profile digest referenced in a credential record, distributor signature, or evidence bundle. In certain embodiments, when a digest mismatch or staleness is detected, verification fails closed and outputs a FAIL reason code and evidence reference rather than outputting a PASS determination.

Profile freshness and monotonicity (non-limiting). In certain embodiments, profiles are versioned and subject to freshness bounds and monotonicity constraints (e.g., maximum staleness, validity intervals, monotonic version sequences, or checkpointed publication), and profile updates are published with new digests and corresponding reason-code semantics.

Figure 11:
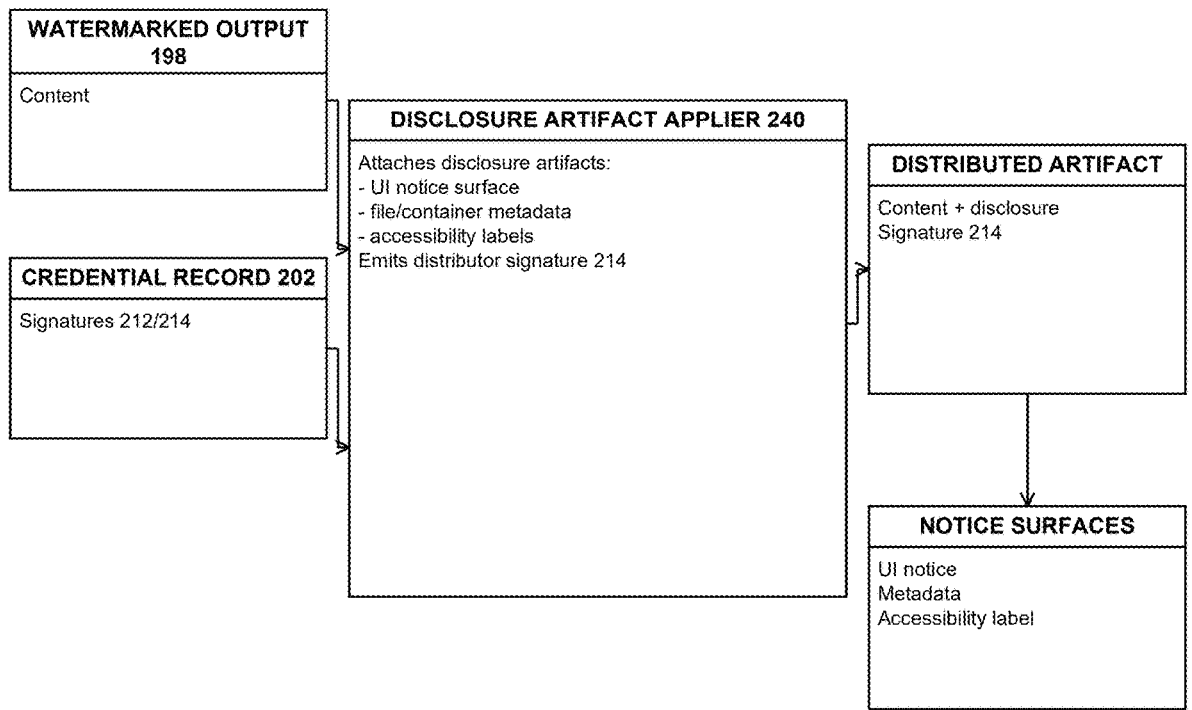
FIG. 11 illustrates distribution and disclosure artifacts, notice surfaces, accessibility labels, and distributor disclosure-preservation signatures.

HUMAN-PERCEIVABLE DISCLOSURE ARTIFACTS, ACCESSIBILITY, AND DISTRIBUTOR PRESERVATION SIGNATURES (FIG. 11)

In certain embodiments, a disclosure artifact applier 240 applies to an external representation of the watermarked output 198 a human-perceivable disclosure artifact selected according to a policy profile. The disclosure artifact may include a visible badge 242, caption/banner/overlay 244, or an audible disclosure tag 246.

Selection of a disclosure artifact may depend on distribution channel, modality, jurisdictional requirements, accessibility needs, and policy profiles. The credential record 202 may include transparency metadata 208 describing notice events, notice surfaces, notice version digests, disclosure modes, and accessibility labels.

In certain embodiments, disclosure artifacts are rendered in an accessibility-aware manner, including selecting placement, contrast, size, language localization, alternative text, captions, and/or audio descriptions to be clear, distinguishable, and compatible with assistive technologies.

In certain embodiments, a distributor system or platform applies a distributor digital signature (distributor signature 214) to at least a portion of the credential record 202, attesting preservation of a required disclosure artifact for a distribution channel.

In certain embodiments, a distributor signature attesting disclosure preservation covers a distribution channel identifier and a policy profile identifier or digest, and further covers a disclosure evidence digest derived from at least one of: (i) a rendered region or segment containing a badge, caption, overlay, or audible disclosure tag; or (ii) parameters used to render the disclosure artifact.

Secure distributor execution (non-limiting). In certain embodiments, one or more distributor-side components, including a disclosure artifact applier, evidence digest generator, and/or distributor signing engine, are executed within a secure or attested runtime environment to protect disclosure rendering logic, evidence digest computation, and signature generation from tampering.

Figure 12:
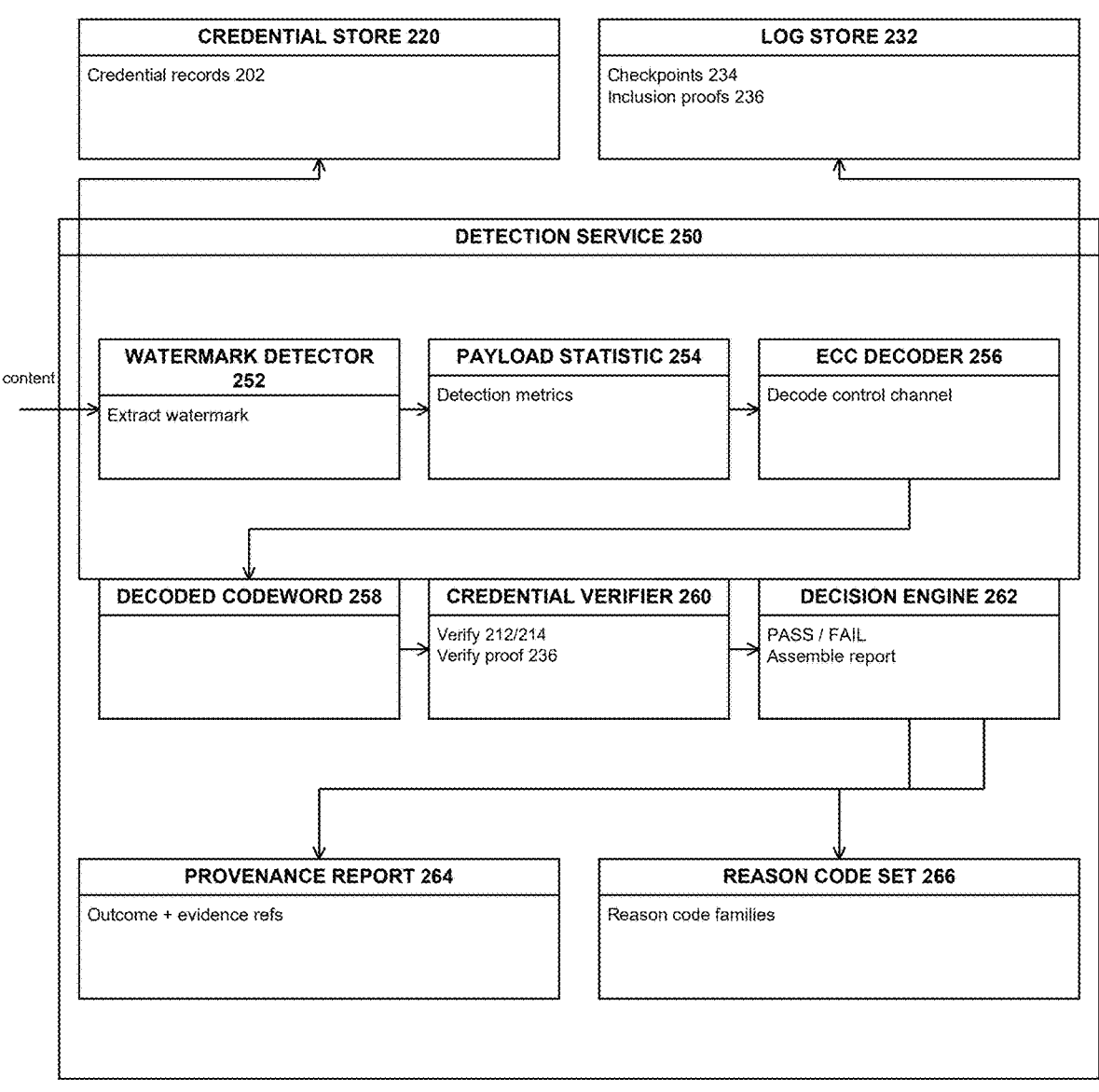
FIG. 12 illustrates a detection pipeline that operates from content alone to compute payload statistics, decode a control-channel codeword, determine a candidate credential record and a candidate commitment, verify integrity and log inclusion, and output a provenance report.
Figure 13:
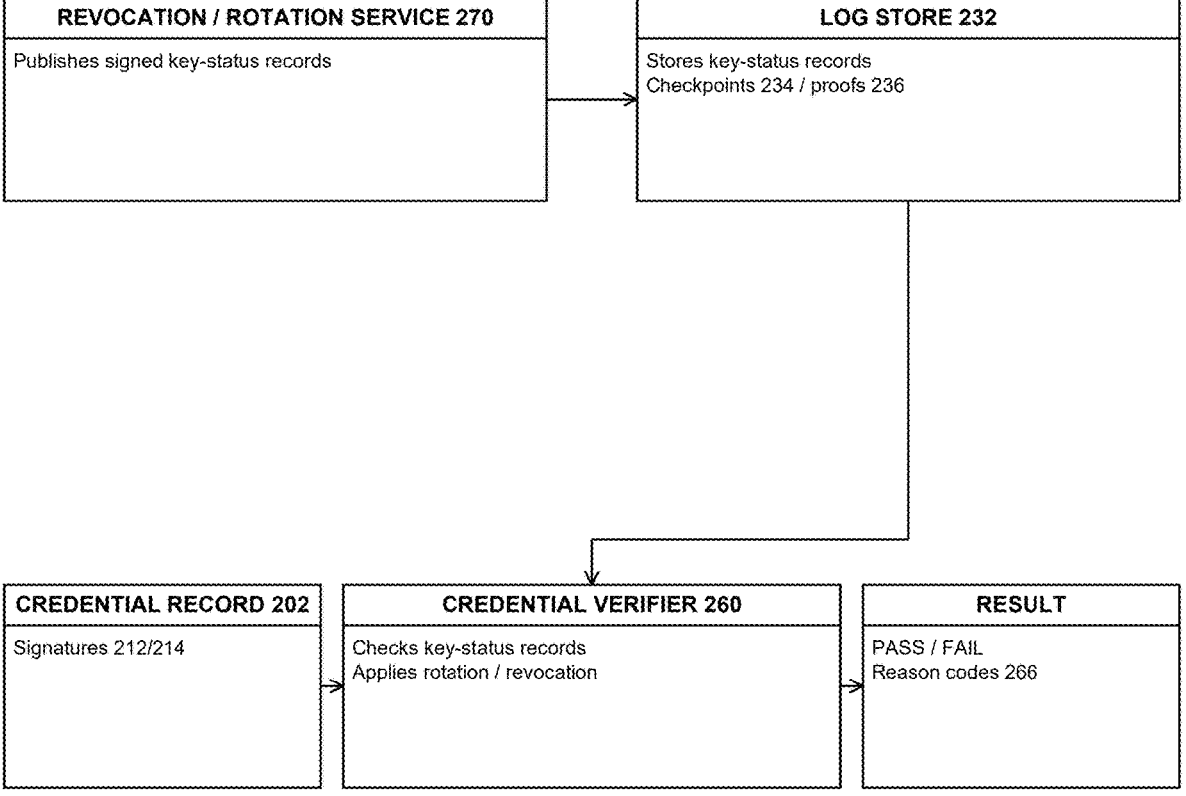
FIG. 13 illustrates key rotation and revocation flows, signed key-status records, and their effect on credential verification.

DETECTION SERVICE AND PROVENANCE DECISION ENGINE (CONTENT-ONLY VERIFICATION) (FIG. 12)

A detection service 250 receives input content that may include a watermark. A watermark detector 252 computes, from the input content alone, at least one payload channel statistic 254. The detector 252 also attempts, from the input content alone, to decode a control-channel codeword using an error-correcting decoding process via an ECC decoder 256 to obtain a decoded codeword 258.

Based at least on the decoded codeword 258, the detection service 250 determines a candidate credential record 202 and/or a candidate cryptographic commitment 172 corresponding to an activation digest used in watermarking. In one embodiment, the decoded codeword is used as an index into a credential store 220 storing credential records. In another embodiment, a deterministic function is applied to the decoded codeword to reconstruct a candidate commitment in a canonical commitment representation. In one non-limiting embodiment, the deterministic function comprises computing a cryptographic hash (e.g., SHA-256) of the decoded control-channel codeword and mapping the hash to a canonical commitment representation (e.g., by encoding the hash and associated scheme parameters in a deterministic format).

Efficient candidate search structures (non-limiting). In certain embodiments, determination of candidate credential records, candidate commitments, and/or candidate keys uses one or more similarity-search indexes or approximate nearest-neighbor data structures to reduce lookup cost over large candidate sets, including graph-based indexes and other sublinear retrieval structures. Such indexing may be applied to codeword-derived indices, canonical commitment representations, latent/noise representations, or other deterministic candidate keys, without limiting the claims.

A credential verifier 260 verifies integrity of the candidate credential record 202, including verifying a provider signature 212, verifying that the candidate commitment is included in the tamper-evident log store 232 with a valid inclusion proof 236 anchored by a transparency checkpoint 234, verifying witness cosignatures when present, consulting a signed key-status record when present, and, when a distributor signature 214 attesting disclosure preservation is present, verifying the distributor signature 214.

In certain embodiments, a verifier recomputes the disclosure evidence digest from the disclosed representation and verifies the distributor signature over the recomputed digest and associated distribution channel identifier and/or policy profile digest.

A provenance decision engine 262 outputs a provenance report 264 indicating whether the input content is likely to have been generated by a watermarked artificial intelligence model. The provenance report 264 may include a provider identifier, a model family, an inference time window, a detector profile identifier, and machine-verifiable reason codes and evidence references.

Statistical confidence and target-FPR calibration (non-limiting). In certain embodiments, the payload statistic and/or control-channel decoding outcome is mapped to an interpretable confidence measure (e.g., a p-value, z-score, likelihood ratio, or calibrated score) and compared to a predetermined detection threshold selected to achieve a target false-positive rate class specified by a detector profile.

Multiple-hypothesis handling (non-limiting). In certain embodiments, when verification evaluates multiple candidate issuers, keys, records, or commitments, the verifier applies a multiple-hypothesis handling rule specified by a policy profile (e.g., threshold adjustment, correction, or decisioning constraints) to maintain a target false-positive rate class, and records corresponding reason codes and evidence references.

PROVENANCE REPORT FORMATS AND REASON CODES (FIG. 14)

The provenance report 264 may be represented as a structured document, a manifest extension, a human-readable report, and/or a machine-verifiable response. The report may include fields for detection confidence, decoded control-channel information, credential verification status, log inclusion status, disclosure preservation status, and key-status verification.

Reason codes may be included to support deterministic auditing. Non-limiting reason code families include: WM_DETECT (watermark detection), CC_DECODE (control-channel decoding), CRED_SIG (credential signature verification), LOG_INC (log inclusion verification), DISC_PRES (disclosure preservation), and KEY_STATUS (key rotation/revocation/status). Each family may have PASS/FAIL codes and may carry evidence references. Illustrative code values and evidence references are provided in Appendix D.

ROBUSTNESS TO CONTENT-PRESERVING TRANSFORMATIONS

In certain embodiments, the dual-channel watermark 192 is configured such that the payload channel statistic exceeds a predetermined detection threshold after content-preserving transformations including paraphrasing, cropping, scaling, lossy re-encoding, and format conversion. Robustness may be achieved by redundancy, spread-spectrum encoding, multi-location embedding, and ECC-protected control-channel encoding.

For text, robustness to paraphrasing may be improved by embedding control-channel information across multiple segments and by selecting bucket assignments and detector profiles that preserve detectable statistical properties under rewriting. For images, robustness may be improved by embedding across multiple frequency bands and spatial regions. For audio, robustness may be improved by embedding in bands resilient to compression.

THREAT MODEL, SECURITY ANALYSIS, AND MITIGATIONS

The specification contemplates attacks including watermark removal and laundering; collusion attacks across outputs; key inference attempts; replay and mixing attacks; credential forgery or spoofing; signature substitution; stale or revoked keys; log manipulation; distributor non-compliance; and runtime compromise.

Mitigations may include binding watermark keys to activation-derived digests and attestation data; rotating keys and watermark parameters with logged rotation events; using tamper-evident logs with witnessed checkpoints; enabling content-only detection with ECC decoding and candidate determination paths; using commitments and selective disclosure to limit leakage; and using distributor preservation signatures for accountability.

In certain embodiments, the threat model includes misuse scenarios that create ethical or societal harm, such as impersonation, harassment, deepfake laundering, and deceptive redistribution without disclosure. Mitigations described herein are configured to support enforceable accountability and accessible disclosure, while limiting information leakage through commitments and selective disclosure.

In certain embodiments, the threat model further includes counterfeit watermarking and record substitution attacks, including re-watermarking by third parties, control-channel collisions, and attempts to bind content to an unauthorized or mismatched credential record; mitigations include provider-signature verification, commitment consistency checks, and log-inclusion verification anchored by transparency checkpoints (and, when used, witness cosignatures and key-status records).

Text normalization and tokenization-shift attacks (non-limiting). In certain embodiments, the threat model includes content-preserving but detector-relevant transformations such as whitespace and formatting perturbations, tokenization boundary shifts, homoglyph substitutions, insertion of zero-width characters, and reversible generative re-encodings (e.g., insertion and later removal of marker characters). In certain embodiments, mitigations include canonicalization/normalization prior to hashing, decoding, or verification, and recording a normalization profile identifier and/or normalization version digest in the credential record and/or detector profile to ensure consistent verification.

Set-level distribution-shift and aggregation attacks (non-limiting). In certain embodiments, an adversary attempts watermark inference, removal, or forgery by aggregating many outputs that share a key, seed, or latent/noise pattern and estimating a systematic difference between watermarked and non-watermarked content (e.g., by comparing averages or other aggregate statistics over large sets). Mitigations may include increasing key diversity (e.g., using many distinct seeds/noise instances), limiting reuse, rotating keys or patterns, and employing multi-stage candidate determination such that coarse identifiers do not, by themselves, reveal a stable watermark pattern. These techniques are illustrative and do not limit the claims.

Diffusion-model erasure and regeneration attacks (non-limiting). In certain embodiments, the threat model includes regeneration and erasure attacks in which an adversary applies diffusion-based "img2img" or denoising pipelines to reduce or remove embedded signals while preserving semantic or perceptual content. In certain embodiments, evaluation includes such erasure/regeneration channels and corresponding robustness metrics, and mitigations include multi-stage candidate determination, robust control-channel coding, and verification by credential signatures and log inclusion. These embodiments are illustrative and non-limiting.

Erasure-distortion approximation layers (non-limiting). In certain embodiments, robustness is improved by applying, during training and/or evaluation, one or more erasure-distortion approximation layers that simulate regeneration or erasure channels, including multi-scale low-pass filtering and noise compensation, latent-domain perturbations, and/or decoder-domain augmentations, to increase robustness of payload detection and control-channel decoding under diffusion-based editing or denoising.

PERFORMANCE, RESOURCE OVERHEAD, AND OPERATIONAL CONSIDERATIONS

Implementations may trade off robustness and security against resource overhead. Overheads may include activation sampling, projection, ECC encoding, watermark embedding, signing, and logging. Implementations may use sampling rate controls, batching, hardware acceleration, and asynchronous logging to reduce latency.

Operationally, providers may maintain policy profiles per distribution channel, including disclosure requirements, robustness settings, detector profiles, and key rotation cadence. Distributors may maintain compliance rules for preserving disclosures and may provide auditing interfaces that expose preservation signatures and evidence bundles.

ALTERNATIVE EMBODIMENTS AND DESIGN-AROUND HARDENING VARIANTS (WITHOUT NARROWING)

The specification explicitly contemplates alternative embodiments and combinations. Projection may be replaced by any dimensionality reduction or sketching approach; error-correcting encoding may be replaced by any redundancy mechanism enabling recovery under noise; the control-channel codeword may encode either an index into a credential store or a value from which a commitment is deterministically reconstructed; and the payload channel may be any statistic enabling reliable detection under a detector profile.

The activation digest may be computed from activations from multiple layers or modalities; from partial activations combined with configuration digests; from stochastic sampling patterns; or from ensembles of projections with multiple ECC segments. Record schemas may be extended while maintaining backwards-compatible verification.

Diffusion-model latent-state recovery variants (non-limiting). In certain embodiments for diffusion-based generators, internal execution signals include an initial noise vector, latent variables, or intermediate denoising states. In certain embodiments, detection may be performed without access to the original prompt, guidance strength, or the number of generation steps, and may optionally include an inversion procedure to estimate an internal latent/noise state from an output artifact and compare a derived representation to a committed value and/or a control-channel-determined candidate, under a detector profile.

Generation-integrated watermarking variants (non-limiting). In certain embodiments, watermarking is integrated into a generator by modifying or fine-tuning one or more components (e.g., a decoder, latent-to-output renderer, or post-processor) such that generated artifacts inherently exhibit the dual-channel watermark statistics and support control-channel candidate determination, without requiring post-hoc pixel/token overlay.

Reproducible seed/latent derivation using salted hashing (non-limiting). In certain embodiments, a seed used to derive per-output key material and/or latent/noise state is generated using a cryptographic hash over at least (i) an index or identifier and (ii) a secret salt, and a pseudorandom generator is used to derive a reproducible latent/noise vector and/or per-output parameters from the seed. In certain embodiments, such identifiers encode metadata usable for later validation (e.g., provider/model identifiers, time windows, or policy identifiers). These embodiments are illustrative and do not limit the claims.

Optional online enhancements may be used, such as fetching revocation status or witness cosignatures, while preserving a baseline offline verification path from content alone.

EXAMPLE WORKFLOWS AND USE CASES

Provider-only workflow: a provider runs inference in an execution environment (including, in certain embodiments, an attested runtime), embeds a dual-channel watermark into output, stores a signed credential record, logs a commitment entry, and distributes output.

Provider-plus-platform workflow: a platform distributes watermarked output and applies a disclosure artifact according to a policy profile. The platform signs a preservation statement for the disclosure artifact and attaches or links it to the credential record, enabling downstream auditors to verify watermark presence and disclosure preservation.

Multi-platform workflow: multiple distributors apply channel-specific disclosures and preservation signatures while referencing a single provider-issued credential record. A detector verifies provider signature, log inclusion, and distributor signatures associated with the channel from which content was obtained.

EXPERIMENTAL EVALUATION PLAN AND METRICS

Non-limiting evaluation metrics include detection performance (true positive rate, false positive rate, ROC/AUC); control-channel decoding success rate and bit error rate under transformations; payload statistic thresholds under detector profiles; robustness scores across transformation suites; resistance to collusion and key inference; revocation correctness and propagation latency; privacy leakage bounds; and operational overhead.

APPENDICES

The following appendices are provided for convenience and form part of this written description. Unless expressly stated otherwise, the appendices are illustrative and non-limiting and do not require any particular implementation, schema, encoding, parameter value, threshold, profile, or ordering; the invention is defined by the claims.

If any inconsistency exists between an appendix and the body of the specification, the body of the specification controls. References in the appendices to specific field names, formats, reason codes, profiles, or examples are exemplary, and functional equivalents and variations—including additional, fewer, renamed, retyped, reordered, partitioned, encrypted, or selectively disclosed artifacts and evidence bundles—are expressly contemplated.

By way of example, Appendix A provides canonical terminology; Appendix B describes credential record formats and example encodings; Appendix C describes log/checkpoint/inclusion-proof artifacts; Appendix D provides an illustrative reason-code taxonomy; Appendix E describes illustrative operational flows; Appendix F provides deployment profiles and interoperability notes; Appendix G provides informative compliance mapping; and Appendix H summarizes interoperability and equivalents.

Appendix A—Glossary of Canonical Terms
(Illustrative; Non-Limiting)

Activation digest: A digest computed from sampled internal activations and/or other internal execution signals of a model, for example by projection and error-correcting encoding, and optionally by hashing, salting, or both.

Activation sampler: A component configured to sample internal activations during execution at one or more sampling locations.

Attestation data: Data describing integrity of at least a portion of an attested runtime environment, derived from or including fields of an attestation report.

Attestation report: A report including measurements and freshness evidence for validating runtime integrity and configuration.

Attestation verifier: A component that validates an attestation report and derives validated attestation data used for integrity binding and/or key derivation.

Attested runtime environment: A runtime capable of producing an attestation report, including a trusted execution environment, confidential VM, or measured boot chain.

Candidate credential record: A credential record selected for verification based on content-derived signals, for example using a decoded control-channel codeword as an index into a credential store.

Candidate cryptographic commitment: A commitment value determined for verification, for example by extracting a commitment field from a candidate credential record, by deterministically reconstructing from a decoded codeword, or by equivalent mechanisms.

Canonical commitment representation: A deterministic representation of a commitment value and associated scheme parameters sufficient to enable consistent verification across implementations.

Content-only (from content alone): Verification or detection operations that compute at least a payload statistic and attempt control-channel decoding using the content itself without requiring online communication with a provider backend system, though optional online enhancements may be used in certain embodiments.

Content-preserving transformation: A transformation that aims to preserve semantic or perceptual content while altering representation, including paraphrasing, cropping, scaling, lossy re-encoding, format conversion, and analogous variants.

Content provenance manifest: A structured document format suitable for packaging provenance information (including credentials and/or signatures) with content, including embedded container metadata, sidecar artifacts, or referenced records.

Control-channel codeword: A codeword embedded in content as part of a dual-channel watermark, configured to be decoded to support candidate determination for verification.

Credential record/Verifiable inference credential record: A structured record including at least a cryptographic commitment to an activation digest and output metadata describing at least a watermarked output, optionally including policy flags, transparency metadata, detector profile references, and signatures.

Credential store: A store for credential records, optionally indexed by values derived from a decoded control-channel codeword and/or record identifiers.

Credential verifier: A component configured to verify integrity of a credential record, including verifying signatures, commitment consistency, log inclusion proofs, and key-status records when present.

Disclosure artifact: A human-perceivable disclosure applied to an external representation of content, such as a visible badge, caption/banner/overlay, or audible disclosure tag.

Disclosure artifact applier: A component configured to apply a human-perceivable disclosure artifact to an external representation of content according to a policy profile.

Disclosure evidence digest: A cryptographic digest derived from a disclosed representation and/or rendering parameters of a human-perceivable disclosure artifact, usable to verify preservation of the disclosure artifact for a distribution channel.

Distributor signature: A signature applied by a distributor or platform attesting preservation of disclosure artifacts for a distribution channel.

Distribution channel identifier: An identifier of a distribution surface/platform/context (e.g., platform, feed type, API surface) used for policy selection and accountability.

Domain-separation label: A label, context string, or equivalent input used in key derivation to separate derived keys by purpose and reduce cross-protocol misuse.

Dual-channel watermark: A watermark comprising a payload channel and a control-channel codeword.

ECC encoder/decoder: An error-correcting encoder/decoder pair.

Embedded container metadata: Metadata embedded within a media container or file structure such that it is carried with the content in that container, as distinguished from a sidecar artifact.

External representation: A representation of content as rendered or presented to an end user and/or distribution channel, including displayed frames, captions/overlays, or audible segments.

Inclusion proof: A proof that a given log entry is included in a log state committed by a transparency checkpoint.

Inference context store: A store providing context data (e.g., request identifiers, policy profile identifiers, distribution channel identifiers, time windows) input to key derivation and/or recorded in credential metadata.

Inference request: A request submitted to a model execution engine to produce output from a model input, optionally including inference context data.

Internal activations: Intermediate values produced during execution of a model, including but not limited to hidden states, attention activations, feature maps, logits, intermediate layer outputs, or other internal representations.

Key derivation function: A function producing a session key from inputs including an activation digest, attestation data, inference context data, a domain-separation label, or any combination thereof.

Model execution engine: A component configured to execute an artificial intelligence model to generate output from an input, in some embodiments within an attested runtime environment.

Model input: Input data provided to a model for inference, including text prompts, images, audio, video, or multimodal inputs.

Output metadata: Metadata describing at least a watermarked output, including identifiers, hashes, modality indicators, time windows, distribution channel identifiers, and equivalent descriptors.

Payload channel: A watermark channel configured to support statistical detection under a detector profile.

Payload statistic: A statistic computed from content to support watermark detection under a detector profile.

Policy flags: Fields indicating policies, compliance checks, disclosure requirements, or safety filters applied.

Policy profile: A versioned configuration that specifies disclosure requirements, robustness settings, detector profile references, and/or operational parameters for a distribution context.

Policy profile digest: A cryptographic digest computed over a canonicalized representation of at least a portion of a policy profile, usable to verify policy identity/version and integrity without retrieving the full profile.

Predetermined detection threshold: A threshold associated with a detector profile used to evaluate a payload statistic, in some embodiments calibrated to a target false-positive rate.

Provenance decision engine: A component configured to output a provenance report based on watermark detection results and credential/log verification outcomes, optionally including reason codes and evidence references.

Provenance report: A report indicating whether content is likely machine-generated under the disclosed system, optionally including reason codes and evidence references.

Provider signature: A signature applied to a credential record by a provider signing engine.

Provider signing key: A cryptographic key used by a provider to sign credential records, optionally associated with a signed key-status record.

Reason code set: A taxonomy of PASS/FAIL reason codes for detection, verification, log inclusion, disclosure preservation, and key status.

Sampling locations: One or more points in model execution (e.g., layer indices, token positions, frame indices, time windows) from which internal activations are sampled.

Session key: A key derived per inference session that parameterizes watermark embedding and/or related keyed operations.

Signed key-status record: A signed statement indicating a status of a signing key (e.g., active, revoked, stale) usable by a verifier without online communication in certain embodiments.

Signing engine: A component configured to generate digital signatures over credential records and/or related evidence artifacts using signing keys.

Tamper-evident log store: An append-only log with mechanisms to detect tampering, omission, or equivocation, optionally issuing transparency checkpoints.

Time-window identifier: An identifier of an issuance/validity window (e.g., epoch, interval, checkpoint range) used for key derivation and/or metadata.

Transparency checkpoint: A periodically issued commitment to a log state of a tamper-evident log store, optionally anchored externally and/or cosigned by witnesses.

Trusted execution environment: A hardware- and/or software-backed isolation environment configured to protect code and data used for inference, watermarking, and credential generation from untrusted components.

Watermark detector: A component configured to compute payload statistics and attempt control-channel decoding from content.

Watermark encoder: A component configured to embed a dual-channel watermark into content generated by a model, during generation, as post-processing, or both.

Watermarked output: Output content produced under watermark embedding, including a dual-channel watermark.

Witness cosignature/witness set: One or more signatures by independent witnesses over a transparency checkpoint or equivalent log commitment, used to increase resistance to equivocation and rollback.

Maximum-merge-delay (MMD): A freshness policy for an append-only verifiable log that bounds a maximum elapsed time and/or maximum number of operations between acceptance of a log entry (or a digest derived therefrom) and publication of a signed head under which that entry is provably included. In certain embodiments, MMD is expressed as an interval identifier and/or a numeric bound (e.g., seconds or milliseconds), and is used by a verifier to assess whether inclusion evidence is sufficiently fresh for a PASS determination. MMD is illustrative and does not limit the claims.

Signed head: A signed log commitment representing a current state of an append-only verifiable log, including at least (i) a head identifier (signed_head_id), (ii) an issued-at time (head_timestamp), and (iii) a cryptographic commitment to log state (e.g., a Merkle root or equivalent), optionally accompanied by witness cosignatures. In certain embodiments, a "transparency checkpoint" is represented as, comprises, or is equivalent to a signed head.

Status tuple/status stapling: A freshness descriptor derived from an anchoring event in an append-only verifiable log, including at least a signed_head_id, a head_timestamp, and a staleness_interval (e.g., staleness_interval_ms). "Status stapling" refers to recording such a status tuple (and, in some embodiments, an MMD identifier) in a credential record and/or evidence bundle so that downstream verifiers can reassess freshness and log consistency at review time without re-running an anchoring protocol or requiring online access to a provider backend system. Status tuple and status stapling are evidentiary only and do not alter watermark embedding, detection thresholds, or other VIC-WM semantics; the claims control.

Cross-rail reference: An optional evidentiary pointer in a credential record and/or evidence bundle to one or more external governance receipts or safety receipts associated with the same AI episode, including without limitation a safety_receipt_ref, a permit outcome, and one or more of a policy digest, a policy signature, a validity interval, a revocation reference, and/or a status tuple. Cross-rail references are evidentiary only and do not alter VIC-WM watermarking or verification semantics; the claims control.

Safety receipt reference (safety_receipt_ref): A value that identifies or references an external safety receipt associated with an AI-governed episode, including without limitation a receipt identifier, a content-addressed digest, a pseudonymous token, and/or a tenant-scoped identifier derived using a keyed function (e.g., HMAC). In certain embodiments, safety_receipt_ref is selectively disclosed such that a verifier can validate cross-rail consistency without revealing unnecessary identifying data, and may be accompanied by a permit outcome and/or a policy digest or policy signature.

Appendix B—Verifiable Inference Credential Record Format (Illustrative; Non-Limiting)

This appendix describes illustrative structures for a verifiable inference credential record (also referred to as a "credential record"). All fields, names, types, nesting, ordering, and encodings are examples only and do not limit the scope of the claims. Implementations may add, remove, rename, re-type, reorder, partition, normalize, compress, encrypt, selectively disclose, or otherwise transform fields without departing from the scope of the claims. Any equivalent representation and/or signature envelope (including but not limited to JSON, CBOR, Protocol Buffers, ASN.1, and JOSE/COSE-style envelopes with embedded or detached signatures) is within the scope of the claims.

B.1 Purpose and Binding Semantics (Non-Limiting)

In certain embodiments, the credential record is a provider-issued, verifier-consumable artifact that binds (i) a cryptographic commitment to an activation digest to (ii) metadata describing at least a watermarked output, and optionally to (iii) transparency and disclosure evidence and (iv) detector-profile references used to interpret detection statistics and thresholds.

In certain embodiments, the credential record supports selective disclosure such that a verifier can validate integrity, signatures, log inclusion, and evidence bundles without revealing all metadata fields and/or without revealing the committed activation digest.

B.2 Illustrative Field Families (Non-Limiting)

A credential record may include, in any order and in any equivalent encoding, one or more of:
1. Record identification and versioning
   record version/schema version; record identifier; compatibility indicators.
2. Provider and model context
   provider identifier; model family identifier; model/config deployment identifiers.
3. Runtime attestation (when used)
   attestation digest; selected validated attestation fields; freshness evidence; coverage descriptors.
4. Output metadata
   content identifier; content hash; modality; inference time window; distribution channel identifier (when applicable).
5. Activation commitment
   commitment value; scheme descriptor; salt/blinding descriptor (when applicable); canonical commitment representation for verification.
6. Policy flags
   disclosure-required; safety-filter-applied; policy-profile identifier; deepfake-like indicator; artistic/creative context indicator; and other compliance flags.
7. Transparency metadata
   notice_event_id(s); notice_surface_id(s); notice_version_digest; disclosure_mode; accessibility_label(s); localization_indicator(s).
8. Detector and threshold references (when used)
   detector_profile_id; watermark_profile_id; detection_threshold_id; target-FPR class; profile version identifiers.

9. Signatures
   provider signature over a canonicalized view of the record (or selected fields); distributor preservation signatures when present; witness cosignatures when present; nested or detached signature envelopes.
10. Links and evidence references
   log checkpoint identifiers; inclusion proof references; key-status record references; revocation references; evidence bundle references.
11. Cross-rail governance references (when used)·
   safety_receipt_ref (external safety receipt identifier or digest); permit_outcome (or equivalent disposition); policy_digest and optional policy_signature; permit_validity_ms and/or revocation_id (when applicable); and a status tuple (e.g., signed_head_id, head_timestamp, staleness_interval_ms) and/or MMD identifier for freshness reassessment. Such fields are evidentiary only and do not alter VIC-WM watermarking or verification semantics; the claims control.
   RVAL-style conformance references (optional): conformance_receipt_id and/or conformance_receipt_digest; conformance_pack_id and/or conformance_pack_digest; policy_id and policy_version_digest; validator_id and validator_digest; reason_code_registry_id and reason_code_registry_digest; canonicalization_id; conformance_context_digest (CCD); conformance_outcome {PASS|FAIL|HOLD}; deterministic_reason_code_ids; and, when present, gating_decision_record_id/digest or equivalent enforcement evidence. Field names are illustrative and non-limiting; functional equivalents are contemplated.

B.3 Canonicalization and Signature Integrity (Non-Limiting)

In certain embodiments, signature verification is made deterministic by defining a canonicalization rule for the signed view (e.g., canonical field ordering, canonical encodings, explicit version and profile identifiers). Canonicalization mechanisms are implementation details and do not limit the claims; any mechanism enabling verifiable integrity of credential content is contemplated.

In certain embodiments, credential records and associated evidence bundles support canonicalization, selective disclosure, redaction, and privacy-preserving verification such that a verifier can validate integrity, signatures, commitment consistency, and log inclusion while omitting, minimizing, or withholding unnecessary metadata fields and without revealing underlying internal execution signals or proprietary model parameters; these mechanisms are illustrative and non-limiting.

Verifiable-credential envelope option (non-limiting). In certain embodiments, a credential record is represented as or embedded within a verifiable-credential-style envelope, including an issuer identifier, a credential subject, and a proof section, while preserving the binding semantics of the commitment and supporting detached or nested signatures and selective disclosure.

B.4 Example B-1—Illustrative Credential Record Encoding (Non-Limiting)

This example is illustrative only. Field names, types, nesting, ordering, and encodings may vary, and any equivalent representation (including JSON/CBOR/Protobuf/

ASN.1 and JOSE/COSE envelopes with embedded or detached signatures) is within the scope of the claims.

```
{
    "record_version": "<string>",
    "provider_id": "<string>",
    "model_family": "<string>",
    "runtime_attestation": {
        "attestation_digest": "<bytes|hex>",
        "freshness": "<nonce|timestamp|counter>",
        "attestation_fields": "<map|optional>"
    },
    "output_metadata": {
        "content_id": "<string>",
        "content_hash": "<bytes|hex>",
        "modality": "<text|image|video|audio>",
        "time_window": "<string>",
        "distribution_channel_id": "<string|optional>"
    },
    "activation_commitment": {
        "commitment": "<bytes|hex>",
        "scheme": "<string>",
        "salt_or_blinding_hint": "<optional>"
    },
    "policy_flags": {
        "policy_profile_id": "<string>",
        "disclosure_required": "<bool|optional>",
        "safety_filter_applied": "<bool|optional>",
        "deepfake_like": "<bool|optional>",
        "artistic_context": "<bool|optional>"
    },
    "transparency_metadata": {
        "notice_event_id": "<string|optional>",
        "notice_surface_id": "<string|optional>",
        "notice_version_digest": "<bytes|hex|optional>",
        "disclosure_mode": "<string|optional>",
        "accessibility_label": "<string|optional>",
        "watermark_profile_id": "<string|optional>"
        "detector_profile_id": "<string|optional>",
        "detection_threshold_id": "<string|optional>"
    },
    "signatures": {
        "provider_sig": "<bytes|base64>",
        "distributor_sigs": ["<bytes|base64>", " . . . "]
    },
    "cross_rail": {
        "safety_receipt_ref": "<string|bytes|optional>",
        "permit_outcome": "<string|optional>",
        "policy_digest": "<bytes|hex|optional>",
        "policy_signature": "<bytes|base64|optional>",
        "permit_validity_ms": "<int|optional>",
        "revocation_id": "<string|optional>".
        "mmd_id": "<string|optional>"
        "status_tuple": {
            "signed_head_id": "<string|optional>",
            "head_timestamp": "<string|optional>",
            "staleness_interval_ms": "<int|optional>"
        }
    },
    "links": {
        "log_checkpoint_id":
        "<string|optional>",
```

```
        "inclusion proof_ref": "<string|optional>",
        "key_status_ref": "<string|optional>"
    }
}
```

APPENDIX C—LOG ENTRIES, CHECKPOINTS, AND INCLUSION PROOFS (ILLUSTRATIVE; NON-LIMITING)

This appendix describes illustrative artifacts for tamper-evident logging and transparency verification. All formats are examples only and may be replaced by equivalent append-only transparency structures.

C.1 Log Entries (Non-Limiting)

In certain embodiments, a tamper-evident log store maintains log entries that bind credential issuance to commitments. A log entry may include one or more of: a log entry identifier; a credential record identifier; an activation commitment; a timestamp or sequencing indicator; policy outcomes; reason codes; and key rotation/revocation event information and/or references.

C.2 Checkpoints (Non-Limiting)

In certain embodiments, the log store periodically issues a checkpoint committing to a current log state. A checkpoint may include a checkpoint identifier; a commitment to log state (e.g., Merkle root or equivalent); issued—at time; witness set identifiers and/or cosignatures when present; and an anchoring reference to external publication or widely witnessed anchoring.

MMD and status-tuple support (non-limiting). In certain embodiments, a checkpoint (or signed head) further includes or is associated with: a head identifier (signed_head_id), an issued-at time (head_timestamp), and an applicable freshness bound (e.g., an MMD identifier or interval). In certain embodiments, an evidence bundle and/or credential record includes a status tuple derived from an anchoring event, including at least signed_head_id, head_timestamp, and staleness_interval_ms, enabling offline reassessment of freshness at review time.

C.3 Inclusion Proofs (Non-Limiting)

In certain embodiments, an inclusion proof enables a verifier to confirm membership of an entry (or leaf derived from an entry) in a log state committed by a checkpoint. Inclusion proofs may include a checkpoint identifier; a leaf representation; an audit path; and positional information. Equivalent membership proofs and transparency constructions are contemplated.

Evidence bundle (non-limiting). In certain embodiments, an evidence bundle includes one or more of: a transparency checkpoint, an inclusion proof, a consistency proof, witness cosignatures, key-status records, distributor preservation signatures, policy/profile digests, and normalization version digests, packaged for offline-capable verification.

APPENDIX D—POLICY FLAGS, TRANSPARENCY METADATA, AND REASON CODE TAXONOMY (ILLUSTRATIVE; NON-LIMITING)

Figure 14:
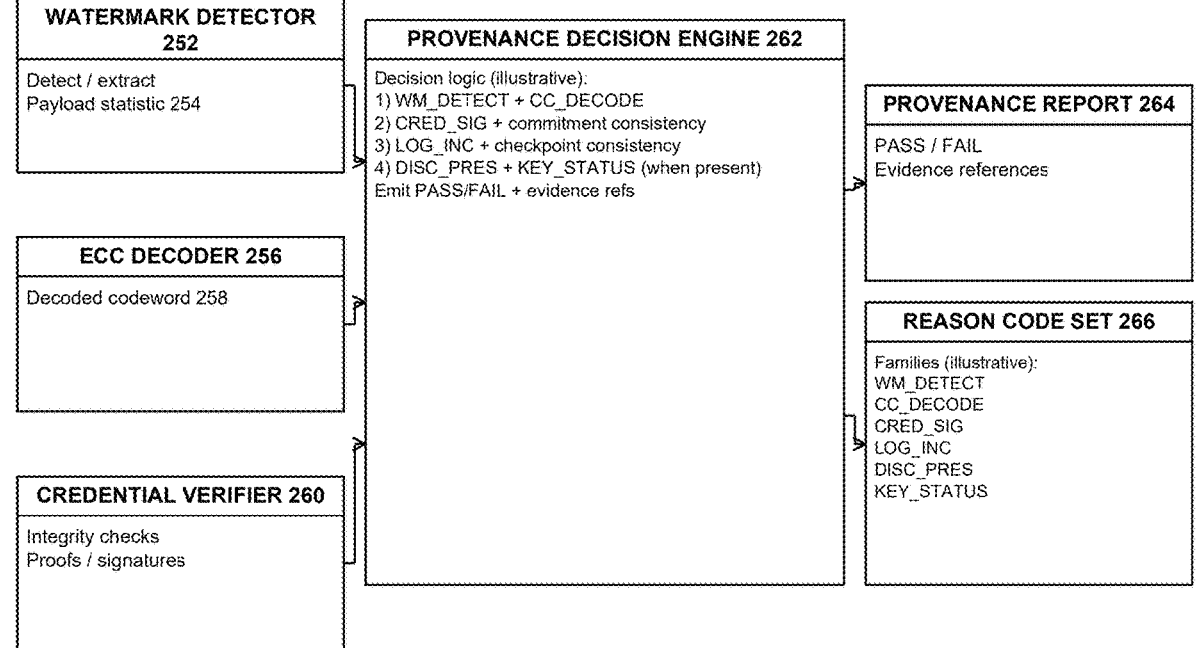
FIG. 14 illustrates a reason-code taxonomy and provenance decision logic producing PASS/FAIL outcomes with evidence references.

This appendix provides illustrative reason code families (e.g., as referenced in FIG. 14). Codes and evidence references are examples only and may be extended, renamed, or restructured.

D.1 Illustrative Reason Code Families (Non-Limiting)

WM_DETECT: PASS_PRESENT; FAIL_ABSENT; FAIL BELOW_THRESHOLD

CC_DECODE: PASS_DECODED; FAIL_UNDECODABLE; FAIL_BER_TOO_HIGH

CRED_SIG: PASS_VALID_SIG; FAIL_BAD_SIG; FAIL_UNKNOWN_PROVIDER_KEY

LOG_INC: PASS_INCLUDED; FAIL_NOT_IN-CLUDED; FAIL_BAD_PROOF; FAIL_CHECK-POINT_ROLLBACK

DISC_PRES: PASS_DISCLOSED; FAIL_MISSING_DISCLOSURE; FAIL_BAD_DISTRIBUTOR_SIG

KEY_STATUS: PASS_KEY_ACTIVE; FAIL_KEY_RE-VOKED; FAIL_KEY_STALE

CROSS_RAIL: PASS_RECEIPT_BOUND; FAIL MISS-ING_RECEIPT; FAIL_POLICY_DIGEST_MIS-MATCH; FAIL_BAD_POLICY_SIGNATURE; HOLD_STALE_STATUS_TUPLE; HOLD_INSUFFI-CIENT_RECEIPT_EVIDENCE

D.2 Evidence References (Non-Limiting)

In certain embodiments, provenance reports include evidence references such as checkpoint identifiers, witness cosignature references, inclusion proof references, signature identifiers, detector profile identifiers, and key-status record references.

Optional HOLD/INCONCLUSIVE outcomes (non-limiting). In certain embodiments, provenance decision logic supports HOLD/INCONCLUSIVE outcomes when evidence is insufficient, stale, or conflicting, and outputs corresponding reason codes and evidence references to enable escalation, appeal, or additional evidence retrieval without asserting a PASS determination.

APPENDIX E—ILLUSTRATIVE GENERATION
AND DETECTION FLOWS (NON-LIMITING)

This appendix describes illustrative operational flows in narrative form. Steps may be reordered, combined, repeated, omitted, or supplemented.

E.1 Provider-Side Generation Flow (Non-Limiting)

In certain embodiments, a provider may: validate attestation (when used), sample internal activations during inference, project and error-correcting encode to produce an activation digest, generate a cryptographic commitment to the activation digest, derive a session key from the activation digest and selected attestation fields and/or inference context with domain separation, embed a dual-channel watermark during generation and/or post-processing, build and sign a credential record, append a log entry and issue or reference a checkpoint, and publish the watermarked output and/or the credential record via one or more packaging or retrieval mechanisms.

E.2 Content-Only Detection and Verification Flow (Non-Limiting)

In certain embodiments, a detector may compute a payload statistic from content alone and compare to a predetermined detection threshold defined by a detector profile, decode a control-channel codeword from content alone, determine a candidate credential record and/or candidate commitment, verify provider signatures, verify log inclusion via inclusion proofs anchored by checkpoints (and witness cosignatures when present), verify key-status records when present, verify distributor disclosure preservation signatures when present, and output a provenance report with machine-verifiable reason codes and evidence references.

APPENDIX F—DEPLOYMENT PROFILES AND
LICENSING/INTEROP NOTES (ILLUSTRATIVE;
NON-LIMITING)

To facilitate interoperability, some embodiments publish one or more deployment profiles identified by profile identifiers. Profiles may specify modality settings, control-channel decoding parameters, payload statistics and thresholds, disclosure requirements, key rotation cadence, and minimum evidence bundles.

Illustrative profiles include: Provider-Only Profile; Provider-Plus-Platform Disclosure Profile; Multi-Platform Preservation Signature Profile. Reference detector implementations and conformance suites may be published to support repeatable verification outcomes.

HTI-Interop Evidence Bundle Profile (illustrative; non-limiting). In certain embodiments, a deployment profile specifies an evidence bundle that includes: (i) a VIC-WM credential record and provider signature; (ii) a transparency checkpoint/signed head and inclusion proof (and, when present, witness cosignatures and key-status records); and (iii) a cross-rail governance binding object including a safety_receipt_ref and permit_outcome (and, when available, policy_digest/policy_signature and a status tuple), enabling a verifier to jointly assess provenance and permit governance for an AI episode while preserving VIC-WM's baseline content-only verification path.

APPENDIX G—COMPLIANCE MAPPING
(INFORMATIVE; NON-LIMITING)

This appendix provides exemplary mappings between certain embodiments and illustrative transparency, labeling, provenance, logging, disclosure, accessibility, and accountability obligations found in policy frameworks. This appendix is provided for explanatory purposes only, is not legal advice, and does not limit any claim to any particular law, regulation, jurisdiction, standard, policy, implementation, or effective date. Laws and policies may change; the claims control.

In general, certain embodiments may support: (i) machine-readable marking that remains detectable after common content-preserving transformations; (ii) human-perceivable disclosure artifacts selected under a policy profile and rendered in an accessibility-aware manner; and (iii) audit-ready evidence artifacts for investigation, monitoring, and enforcement workflows, including verifiable inference credential records, cryptographic commitments, tamper-evident log entries, transparency checkpoints, inclusion proofs, and a reason code set with evidence references. When present, distributor signatures, signed key-status records, and disclosure evidence digests can extend accountability across distribution channels without requiring exposure of proprietary model parameters or underlying internal execution signals.

Republic of Korea—AI transparency and labeling (informative; non-limiting). Certain Korean frameworks include transparency obligations for high-impact AI and generative AI, including advance notice that a product or service is AI-based, marking of generative AI outputs, and clear notice or marking for deepfake-like audio, image, or video content such that users can readily recognize the content as AI-generated or AI-manipulated, with permitted non-intrusive approaches for artistic or creative contexts. Certain frameworks may apply to out-of-jurisdiction conduct when domestic markets or users are affected.

European Union—AI Act transparency obligations (informative; non-limiting). Certain EU obligations include transparency requirements for certain AI systems and outputs, including: informing persons that they are interacting with an AI system in specified interaction contexts; disclosure that deepfake-like image, audio, or video content has been artificially generated or manipulated, with tailored disclosure for evidently artistic, creative, satirical, or fictional contexts; disclosure for certain AI-generated or AI-manipulated text published to inform the public on matters of public interest, subject to specified exceptions; and requirements that such information be provided in a clear and distinguishable manner conforming to applicable accessibility requirements. Certain EU mechanisms also encourage or facilitate codes of practice and may adopt common rules to support effective implementation of detection and labeling obligations.

In some embodiments, the disclosed system supports such EU and Korean transparency obligations by combining: (i) content-resident dual-channel watermarking that yields a payload statistic for detection and a control-channel codeword for candidate determination; (ii) verifiable inference credential records that bind an inference event to content via a cryptographic commitment to an activation-derived digest; (iii) content-only, offline-capable verification under a detector profile and a predetermined detection threshold, including use of detector_profile_id, watermark_profile_id, and detection_threshold_id; and (iv) audit-ready evidence via a tamper-evident log store with transparency checkpoints, inclusion proofs, and machine-verifiable reason codes with evidence references. When present, distributor signatures and disclosure evidence digests can provide distribution-channel disclosure-preservation accountability.

United States—technical guidance and risk-management frameworks (informative; non-limiting). Certain U.S. guidance and frameworks describe technical and operational approaches for reducing risks posed by synthetic content, including provenance tracking, labeling and watermarking, detection, evaluation, and auditing. In some embodiments, the disclosed policy profile, detector profile, transparency metadata, and evidence artifacts support such approaches by enabling configurable marking, verification, and auditable evidence bundles, while preserving privacy via commitments and selective disclosure.

United States—federal AI governance and acquisition policies (informative; non-limiting). Certain U.S. federal memoranda and policies establish governance, documentation, risk-management, and procurement practices for agency use and acquisition of AI systems and services, including uses that impact rights or safety. In some embodiments, policy profiles, reason codes, signed key-status records, and audit-ready logs and checkpoints provide implementation-oriented evidence artifacts suitable for documenting disclosure and verification practices across deployments.

United States—deception and impersonation enforcement (informative; non-limiting). Certain U.S. regulatory measures prohibit impersonation of government and businesses in commerce and support enforcement addressing deception and fraud. In some embodiments, content-resident watermarking, human-perceivable disclosure artifacts, and evidence bundles described herein support detection, investigation, and documentation of AI-enabled impersonation and deceptive synthetic content campaigns.

United States—harmful synthetic intimate imagery and platform processes (informative; non-limiting). Certain U.S. laws address nonconsensual intimate imagery, including computer-generated "digital forgeries," and may require covered platforms to implement notice-and-removal related processes. In some embodiments, distributor signatures, disclosure evidence digests, and tamper-evident logging support channel-specific accountability and evidentiary documentation for such processes, without exposing proprietary model parameters or underlying internal execution signals.

Cross-jurisdiction deployment note (informative; non-limiting). Transparency and labeling obligations vary by jurisdiction, modality, and distribution context. In some embodiments, policy profiles and detector profiles enable configurable, auditable deployment choices across jurisdictions, while preserving a baseline content-only, offline-capable verification path.

Non-limiting note on mapping. The mappings above are illustrative. The disclosed mechanisms are broadly applicable to regimes requiring provenance, labeling, disclosure, logging, auditability, accessibility-aware notice, platform accountability, or related transparency obligations for machine-generated or AI-manipulated content.

APPENDIX H—INTEROPERABILITY AND EQUIVALENTS (ILLUSTRATIVE; NON-LIMITING)

References to particular technologies, formats, vendors, standards, or profiles are exemplary. Functional equivalents and variations remain within the scope of the claims. Unless expressly stated otherwise, components may be combined, partitioned, virtualized, replicated, reordered, substituted, or implemented in hardware, software, firmware, or any combination thereof, without departing from the scope of the claims.

Attestation equivalents. References to a trusted execution environment, confidential VM, enclave, measured boot chain, or hardware-backed isolation are exemplary and encompass any mechanism capable of producing cryptographically verifiable evidence of runtime integrity, configuration, and freshness, including equivalent reports, measurements, counters, nonces, timestamps, and trust anchors.

Credential packaging equivalents. Credential records and related evidence artifacts may be packaged as embedded container metadata, as sidecar artifacts, as references to a credential store, or any combination thereof. Exemplary signed-object encodings include JSON, CBOR, Protocol Buffers, ASN.1, and JOSE/COSE-style envelopes with embedded or detached signatures, without limitation.

Signature and key-status equivalents. Provider signatures, distributor signatures, witness cosignatures, auditor cosignatures, and regulator cosignatures may be layered using nested envelopes, detached signatures, countersignatures, threshold signatures, multisignatures, or other equivalent signature constructions. Signed key-status records and revocation or rotation evidence may be represented using any equivalent signed statement or verifiable status mechanism.

Log, checkpoint, and inclusion-proof equivalents. Tamper-evident logs, transparency checkpoints, anchoring, and inclusion proofs may be implemented using Merkle-tree transparency logs, append-only ledgers, witness cosigning services, or other equivalent append-only and membership-proof constructions, including equivalent anti-equivocation and anti-rollback mechanisms.

Detector profile and threshold equivalents. Detector profiles, watermark profiles, predetermined detection thresholds, and related identifiers may be represented using any equivalent versioned profile and calibration mechanism, including locally cached profiles, published registries, and equivalent parameterization for payload statistics, decoding parameters, and target false-positive rate classes.

Commitment and selective-disclosure equivalents. Cryptographic commitments may be binding commitments, hiding commitments, polynomial commitments, hash-based commitments, or other equivalent commitment schemes, optionally supporting selective disclosure, redaction, or privacy-preserving verification using equivalent cryptographic constructions.

Projection, coding, and embedding equivalents. References to particular projections or error-correcting codes are exemplary and encompass any dimensionality reduction, sketching, quantization, redundancy, or coding mechanisms providing similar robustness and recoverability properties under noise or transformations. Watermark embedding and detection may be performed in output domains, intermediate domains, latent domains, or any combination thereof, and may include spread-spectrum, bucket-assignment, coefficient-selection, or other equivalent constructions.

The invention claimed is:

1. A computer-implemented method for labeling machine-generated content, comprising:
   receiving, at a model execution engine, an inference request including a model input;
   executing an artificial intelligence model on the model input within an execution environment and sampling, during execution, internal activations of the artificial intelligence model at one or more sampling locations;
   projecting the sampled internal activations into a representation having a dimensionality lower than that of the sampled internal activations to produce a projected representation;
   encoding the projected representation using an error-correcting encoder to produce an activation digest;
   generating a cryptographic commitment to the activation digest;
   obtaining inference context data for the inference request, the inference context data comprising at least one of a distribution channel identifier, a policy profile identifier, or a time-window identifier;
   determining whether the execution environment comprises an attested runtime environment and, in response to determining that the execution environment comprises the attested runtime environment, obtaining attestation data associated with the attested runtime environment, the attestation data describing integrity of at least a portion of the runtime environment used to execute the artificial intelligence model;
   deriving a session key by applying a key-derivation function to inputs comprising (i) the activation digest, (ii) the inference context data, and (iii) a domain-separation label identifying a purpose of a derived key, wherein, when the execution environment comprises the attested runtime environment, the inputs further comprise at least a portion of the attestation data;
   embedding, by a watermark encoder parameterized by the session key, into content generated by the artificial intelligence model, a dual-channel watermark comprising a payload channel and a control-channel codeword to produce a watermarked output;
   generating a verifiable inference credential record comprising the cryptographic commitment and metadata describing at least the watermarked output; and
   publishing at least one of the watermarked output and the verifiable inference credential record.

2. The method of claim 1, wherein the inference context data further comprises one or more of: a request identifier, a provider identifier, and a model-family identifier, and wherein the domain-separation label causes the key-derivation function to derive distinct keys for distinct purposes including at least watermark embedding and control-channel mapping, and wherein the control-channel codeword is configured to be error-correcting decodable from the watermarked output alone such that a detector, from the watermarked output alone, can decode the control-channel codeword and, based at least thereon, determine at least one of:
   (i) an identifier usable to obtain, from a credential store storing verifiable inference credential records, a candidate verifiable inference credential record corresponding to the watermarked output; or
   (ii) a value usable to deterministically reconstruct, in a canonical commitment representation, a candidate cryptographic commitment corresponding to the activation digest for verification.

3. The method of claim 1, wherein embedding the dual-channel watermark comprises, for textual content, biasing token selection probabilities of a language model in accordance with key-dependent bucket assignments determined from the session key and encoding bits of the control-channel codeword using the bucket assignments across a plurality of text segments, the dual-channel watermark being configured such that, under a detector profile, after a content-preserving transformation comprising paraphrasing, the control-channel codeword is decodable by an error-correcting decoder with a bit error rate not exceeding a threshold specified by the detector profile.

4. The method of claim 1, further comprising recording, in a tamper-evident log store, a log entry including at least an identifier of the verifiable inference credential record and the cryptographic commitment to the activation digest.

5. The method of claim 1, wherein the cryptographic commitment is generated using a cryptographic commitment scheme configured such that the cryptographic commitment does not enable derivation of the activation digest or reconstruction of the sampled internal activations, and wherein the verifiable inference credential record further comprises one or more flags indicating that specified policies or compliance checks were applied during generation of the watermarked output.

6. The method of claim 1, wherein the verifiable inference credential record is encoded in a manifest format that is attachable as embedded metadata within a media container, as a sidecar file associated with a file containing the watermarked output, or both.

7. The method of claim 1, further comprising validating an attestation report generated by the attested runtime environment to produce validated attestation data, wherein at least a portion of the attestation data used as an input to the key-derivation function is derived from the validated attestation data.

8. The method of claim 1, wherein the dual-channel watermark embedded in the watermarked output remains detectable, with a payload channel statistic exceeding a predetermined detection threshold specified by a detector profile, after at least one content-preserving transformation selected from the group consisting of paraphrasing, cropping, scaling, lossy re-encoding, and format conversion.

9. The method of claim 1, further comprising applying, to an external representation of the watermarked output, a human-perceivable disclosure artifact selected according to a policy profile, the human-perceivable disclosure artifact comprising at least one of a visible badge, caption, banner, overlay, or an audible disclosure tag.

10. The method of claim 1, wherein the verifiable inference credential record further comprises transparency metadata including at least one of: a notice event identifier; a notice surface identifier; a notice version digest; a disclosure mode indicator; an accessibility label; a watermark profile identifier; a detector profile identifier; or a detection threshold identifier corresponding to a target false-positive rate.

11. The method of claim 4, wherein the log entry further includes at least one policy outcome or reason code indicating whether a disclosure requirement was satisfied, and wherein the tamper-evident log store issues transparency checkpoints that are anchored by publication to an external transparency service and cosigned by a plurality of witnesses.

12. The method of claim 9, further comprising receiving, from a distributor system or platform, one or more distributor digital signatures applied to at least a portion of the verifiable inference credential record, each distributor digital signature attesting preservation of the human-perceivable disclosure artifact for a respective distribution channel.

13. A system for labeling machine-generated content, comprising:

a model execution engine configured to execute an artificial intelligence model in response to inference requests within an execution environment;

an activation sampler configured to sample internal activations of the artificial intelligence model during execution at one or more sampling locations;

an activation projection logic configured to project the sampled internal activations into a representation having a dimensionality lower than that of the sampled internal activations to produce a projected representation;

an error-correcting encoder configured to encode the projected representation to produce an activation digest;

a digest commitment logic configured to generate a cryptographic commitment to the activation digest;

an inference context store configured to provide inference context data for an inference request, the inference context data comprising at least one of a distribution channel identifier, a policy profile identifier, or a time-window identifier;

an attestation interface configured, when the execution environment comprises an attested runtime environment, to obtain attestation data describing integrity of at least a portion of a runtime environment used to execute the artificial intelligence model;

a key derivation component configured to derive a session key by applying a key-derivation function to inputs comprising (i) the activation digest, (ii) the inference context data, and (iii) a domain-separation label identifying a purpose of a derived key, wherein, when the execution environment comprises the attested runtime environment, the inputs further comprise at least a portion of the attestation data;

a watermark encoder configured to embed, into content generated by the artificial intelligence model, a dual-channel watermark comprising a payload channel and a control-channel codeword, the dual-channel watermark being parameterized by the session key, to produce a watermarked output;

a verifiable inference credential generator configured to generate a verifiable inference credential record comprising the cryptographic commitment and metadata describing at least the watermarked output; and a network interface configured to output at least the watermarked output and the verifiable inference credential record.

14. The system of claim 13, further comprising an attestation verifier configured to validate an attestation report generated by the attested runtime environment, the attestation data being derived from the validated attestation report.

15. The system of claim 13, wherein the watermark encoder comprises one or more modality-specific watermark encoders configured to embed the dual-channel watermark in at least one respective modality selected from text, image, video, or audio.

16. The system of claim 13, further comprising a log writer and a tamper-evident log store, the log writer being configured to write log entries including the cryptographic commitment, and the tamper-evident log store being configured to issue transparency checkpoints and provide inclusion proofs anchored by the transparency checkpoints, wherein the transparency checkpoints are cosigned by a plurality of witnesses.

17. The system of claim 13, further comprising a credential store configured to store signed instances of the verifiable inference credential record, a signing engine configured to sign the verifiable inference credential record using a provider signing key, a key-status service configured to publish a signed key-status record indicating whether the provider signing key is active or revoked, and a credential verifier configured to verify the signed key-status record.

18. The system of claim 13, wherein the verifiable inference credential generator is configured to encode the verifiable inference credential record in a canonical structured document format suitable for inclusion in a content provenance manifest and configured to support detached signature verification.

19. The system of claim 13, wherein the inference context data comprises at least a distribution channel identifier and a policy profile identifier such that the session key is channel-specific and policy-profile-specific.

20. The system of claim 13, wherein the model execution engine, activation sampler, activation projection logic, error-correcting encoder, digest commitment logic, key derivation component, watermark encoder, and verifiable inference credential generator are implemented at least in part within a trusted execution environment of the attested runtime environment.

21. A non-transitory computer-readable medium storing instructions that, when executed by one or more processors, cause the one or more processors to perform operations comprising:

receiving an inference request including an input;

executing an artificial intelligence model on the input within an execution environment while sampling internal activations;

projecting the sampled internal activations into a representation having a dimensionality lower than that of the sampled internal activations to produce a projected representation;

encoding the projected representation using an error-correcting encoder to produce an activation digest;

generating a cryptographic commitment to the activation digest;

obtaining inference context data for the inference request, the inference context data comprising at least one of a distribution channel identifier, a policy profile identifier, or a time-window identifier;

determining whether the execution environment comprises an attested runtime environment and, in response to determining that the execution environment comprises the attested runtime environment, obtaining attestation data corresponding to the attested runtime environment;

deriving a session key by applying a key-derivation function to inputs comprising (i) the activation digest, (ii) the inference context data, and (iii) a domain-separation label identifying a purpose of a derived key, wherein, when the execution environment comprises the attested runtime environment, the inputs further comprise at least a portion of the attestation data;

embedding, into an output of the artificial intelligence model, a dual-channel watermark comprising a payload channel and a control-channel codeword, the dual-channel watermark being parameterized by the session key, to produce a watermarked output;

generating a verifiable inference credential record comprising the cryptographic commitment and metadata describing at least the watermarked output; and emitting at least the watermarked output from a network interface.

22. The non-transitory computer-readable medium of claim 21, wherein the operations further comprise encoding the verifiable inference credential record in a manifest format and attaching the manifest to a file containing the watermarked output as embedded container metadata and/or as a sidecar file.

23. The non-transitory computer-readable medium of claim 21, wherein the operations further comprise writing a log entry to a tamper-evident log store, the log entry including the cryptographic commitment and a reference to the verifiable inference credential record, and wherein the tamper-evident log store issues transparency checkpoints cosigned by a plurality of witnesses.

24. The non-transitory computer-readable medium of claim 21, wherein the dual-channel watermark is configured such that, when present in the watermarked output, a detector can, from content alone, compute a payload channel statistic and compare the payload channel statistic to a predetermined detection threshold defined by a detector profile, decode the control-channel codeword, and determine a candidate verifiable inference credential record, a candidate cryptographic commitment, or both, for verification.

* * * * *